(12) United States Patent
Hébert

(10) Patent No.: US 11,393,231 B2
(45) Date of Patent: Jul. 19, 2022

(54) SYSTEM AND METHOD FOR TEXT LINE EXTRACTION

(71) Applicant: MyScript, Nantes (FR)

(72) Inventor: David Hébert, Nantes (FR)

(73) Assignee: MyScript, Nantes (FR)

( * ) Notice: Subject to any disclaimer, the term of this patent is extended or adjusted under 35 U.S.C. 154(b) by 50 days.

(21) Appl. No.: 16/715,951

(22) Filed: Dec. 16, 2019

(65) Prior Publication Data

US 2021/0034848 A1 Feb. 4, 2021

(30) Foreign Application Priority Data

Jul. 31, 2019 (EP) .................................... 19189346

(51) Int. Cl.
| | |
|---|---|
| *G06K 9/46* | (2006.01) |
| *G06V 30/32* | (2022.01) |
| *G06K 9/62* | (2022.01) |
| *G06V 10/40* | (2022.01) |
| *G06V 30/10* | (2022.01) |

(52) U.S. Cl.
CPC ......... *G06V 30/347* (2022.01); *G06K 9/6217* (2013.01); *G06V 10/40* (2022.01); *G06V 30/10* (2022.01)

(58) Field of Classification Search
CPC .... G06K 9/00416; G06K 9/46; G06K 9/6217; G06K 2209/01; G06K 9/50
USPC ....... 382/181, 187, 189, 186, 190, 195, 199, 382/200, 224, 226, 203, 204, 309, 311, 382/209, 217, 202
See application file for complete search history.

(56) References Cited

U.S. PATENT DOCUMENTS

| | | | |
|---|---|---|---|
| 5,194,852 A | * | 3/1993 | More ................... G06F 3/04886 345/182 |
| 5,847,712 A | | 12/1998 | Salesin |
| 5,867,596 A | | 2/1999 | Kano et al. |
| 6,453,070 B1 | | 9/2002 | Seni |
| 6,525,749 B1 | | 2/2003 | Moran et al. |
| 6,647,145 B1 | | 11/2003 | Gay |
| 7,218,779 B2 | | 5/2007 | Dodge |

(Continued)

FOREIGN PATENT DOCUMENTS

| | | |
|---|---|---|
| EP | 1973063 | 1/2011 |
| KR | 10-1687941 B1 | 12/2016 |

OTHER PUBLICATIONS

International Search Report for related Application No. PCT/EP2016/001720, dated Jan. 20, 2017, EPO-Internal WPI Data.

(Continued)

*Primary Examiner* — Sheela C Chawan
(74) *Attorney, Agent, or Firm* — McDermott Will and Emery LLP

(57) ABSTRACT

The invention concerns a method implemented by a device for displaying strokes of digital ink in a display area and for performing text line extraction to extract text lines from the strokes. In particular, the text line extraction may involve slicing the display area into strips, ordering for each strip the strokes into ordered lists which form collectively a first set of ordered lists, forming for each strip a second set of ordered lists by filtering out from the ordered lists of the first set strokes which are below a given size threshold, and performing a neural net analysis based on said first and second sets to determine for each stroke a respective text line to which it belongs.

15 Claims, 13 Drawing Sheets

(56) References Cited

U.S. PATENT DOCUMENTS

| | | | |
|---|---|---|---|
| 7,298,903 | B2 | 11/2007 | Wang et al. |
| 7,324,691 | B2 | 1/2008 | Li et al. |
| 7,330,184 | B2 | 2/2008 | Leung |
| 7,352,902 | B2 | 4/2008 | Li et al. |
| 7,394,935 | B2 | 7/2008 | Chen et al. |
| 7,440,616 | B2 | 10/2008 | Li et al. |
| 7,496,232 | B2 | 2/2009 | Bishop et al. |
| 7,574,048 | B2 * | 8/2009 | Shilman ............ G06F 40/103 382/187 |
| 7,616,333 | B2 | 11/2009 | Wakeam et al. |
| 7,904,810 | B2 | 3/2011 | Chen et al. |
| 7,945,097 | B2 | 5/2011 | Biswas et al. |
| 8,014,607 | B2 | 9/2011 | Saund et al. |
| 8,316,299 | B2 | 11/2012 | Asaka |
| 8,718,375 | B2 | 5/2014 | Ouyang et al. |
| 8,782,549 | B2 | 7/2014 | Quyang |
| 9,171,204 | B2 | 10/2015 | Acharya |
| 10,048,824 | B2 | 8/2018 | Jung |
| 10,082,951 | B2 * | 9/2018 | Guiavarc'h ............ G06K 9/222 |
| 10,852,938 | B2 * | 12/2020 | Guiavarc'h ............ G06F 3/0487 |
| 2003/0007683 | A1 | 1/2003 | Wang |
| 2003/0215145 | A1 | 11/2003 | Shilman et al. |
| 2004/0155869 | A1 | 8/2004 | Robinson |
| 2004/0252888 | A1 | 12/2004 | Bargeron |
| 2005/0063592 | A1 | 3/2005 | Li et al. |
| 2005/0063594 | A1 | 3/2005 | Li et al. |
| 2006/0061780 | A1 | 3/2006 | Chen et al. |
| 2006/0098871 | A1 | 5/2006 | Szummer |
| 2006/0210173 | A1 | 9/2006 | Jurion |
| 2006/0218171 | A1 | 9/2006 | Wakeman et al. |
| 2008/0195931 | A1 | 8/2008 | Raghupathy |
| 2008/0232690 | A1 | 9/2008 | Saund et al. |
| 2010/0184485 | A1 * | 7/2010 | Kim .................... G06F 3/1423 455/566 |
| 2013/0297216 | A1 * | 11/2013 | Hirst .................... G16H 50/20 702/19 |
| 2014/0177962 | A1 | 6/2014 | Torgerson |
| 2014/0304505 | A1 * | 10/2014 | Dawson .............. H04L 63/0428 713/165 |
| 2014/0313216 | A1 | 10/2014 | Steingrimsson |
| 2014/0325435 | A1 | 10/2014 | Jung |
| 2014/0363083 | A1 * | 12/2014 | Xia .................... G06K 9/00422 382/189 |
| 2015/0206005 | A1 | 7/2015 | Jung |
| 2017/0068868 | A1 | 3/2017 | Cartune |
| 2017/0109578 | A1 | 4/2017 | Bednarowicz |

OTHER PUBLICATIONS

Plimmer et al., "Beautifying sketching-based design tool content: Issues and experiences," 6th Australasian User Interface Conference, 2005.

Wang et al., "Exploring sketch beautification techniques," CHINZ'05, Jul. 2005, pp. 15-16.

Fiser et al., "Shipshape: A drawing beautification assistant," The Eurographics Association 2015.

European Patent Office—Extended European Search Report and Examination Report for related European Application No. 19/189,346, dated Jan. 8, 2020; 26 pages.

Moysset, B., et al. "Paragraph Text Segmentation into Lines with Recurrent Neural Networks." 2015 13th International Conference on Document Analysis and Recognition (ICDAR) IEEE, Aug. 23, 2015, pp. 456-460.

Tripathy, N., et al., "Handwriting Segmentation of Unconstrained Oriya Text." Frontiers in Handwriting Recognition, 2004-IWFHR-9 2004, 9th International Workshop on Tokyo, Japan—Oct. 26-29, 2004, Piscataway, NJ (US) IEEE—Oct. 26, 2004; pp. 306-311.

Razak, Z., et al., "Off-line Handwriting Text Line Segmentation: A Review." International Journal of Computer Science and Network Security (IJCSNS) Jul. 7, 2008, vol. 8, No. 7; retrieved from the Internet: https://pdfs.semanticscholar.org/d940/889b55390366ced25cf21ff9235010298840.pdf.; pp. 12-20.

* cited by examiner

SYSTEM AND METHOD FOR TEXT LINE EXTRACTION

CROSS REFERENCE TO RELATED APPLICATIONS

This application claims priority to European Application No. 19189346.0, filed on Jul. 31, 2019, the entire contents of which are incorporated herein.

TECHNICAL FIELD

The present disclosure relates generally to the field of computing device interface capable of recognizing user input of text handwriting. In particular, the present disclosure concerns computing devices and corresponding methods for recognizing text lines from strokes of digital ink.

BACKGROUND

Computing devices continue to become more ubiquitous to daily life. They may take various forms such as computer desktops, laptops, tablet PCs, hybrid computers (2-in-1s), e-book readers, mobile phones, smartphones, wearable computers (including smartwatches, smart glasses/headsets), global positioning system (GPS) units, enterprise digital assistants (EDAs), personal digital assistants (PDAs), game consoles, and the like. Further, computing devices are being incorporated into vehicles and equipment, such as cars, trucks, farm equipment, manufacturing equipment, building environment control (e.g., lighting, HVAC), and home and commercial appliances.

Various forms of computing devices are known for inputting and recognizing input elements hand-drawn or handwritten by a user, such as text content (e.g., alphanumeric characters) or non-text content (e.g. shapes, drawings). To this end, known computing devices are usually equipped with a touch sensitive surface or the like to enable users to input handwriting content in the form of strokes of digital ink which may be displayed on a display screen.

A user may typically use an input surface (or any appropriate user interface) to handwrite on a computing device input strokes in a free handwriting format (or free handwriting mode), that is, without any handwriting constraint of position, size and orientation of the text handwriting input. In a free handwriting mode, no line pattern is imposed to the user for the purpose of handwriting. A free handwriting format affords complete freedom to the user during handwriting input, which is sometimes desirable for instance to take quick and miscellaneous notes or make mixed input of text and non-text.

FIG. 1A shows an example of a computing device 1 comprising a display device 1 which displays ink input elements hand-drawn or handwritten by a user in a free handwriting mode using an appropriate user interface. In the present case, the computing device 1 detects and displays text content 4 and 6 and non-text content 8, 10 and 12. Each of these elements is formed by one or more strokes of digital ink. Input elements may comprise for instance text handwriting, diagrams, musical annotations, and so on. In this example, the shape 8 is a rectangle or the like which constitutes a container (a box) containing text content 6 so that both elements 6 and 8 can be selected and manipulated together.

Further, handwriting recognition may also be performed by a computing device by implementing various known techniques. The user handwriting input is typically interpreted using a real-time handwriting recognition system or method. Either on-line systems (recognition carried out using a cloud-based solution or the like) or off-line systems may be used. Once recognized, the computing device may convert the input strokes into a typeset version, as depicted in this example in FIG. 1B.

Text line extraction is one key step in text handwriting recognition. This operation aims at recognizing different text lines from text content input by a user in a free handwriting format. In other words, text line extraction allows a computing device to determine to which text line various input strokes belong. While text line extraction may be relatively straightforward in some cases, it may also become particularly complex and cause errors in others, in particular when a user does not handwrite in a chronological order. In many cases, users are handwriting text in a logical temporal order, such that a computing device may rely on the temporal order of each input stroke to identify the beginning and end of each text line. The difficulty however increases drastically when users handwrite delayed strokes, i.e. in a non-temporal order.

A user may for instance decide to handwrite a group of characters along a certain direction without diacritics for saving time and decide later to supplement the all group of characters with the missing diacritics. Some languages are particularly prone to such a non-chronological handwriting input. For instance, FIGS. 2A and 2B show examples of handwriting input in Arabic and Vietnamese languages. As can be seen, a great number of diacritics, of various forms and styles, are attached to characters. In such languages, the issue of non-chronological handwriting input becomes critical. It may be particularly difficult for a known computing device to determine whether a given diacritic is attached at the top of a character (which means that the diacritic belongs to the text line underneath) or is attached at the bottom of another character (which means that the diacritic belongs to the text line above). Similarly, punctuation marks may be added in packets after handwriting a full sentence or the like, thereby giving rise to more uncertainty. A diacritic may for instance be easily confused with a coma or the like, rendering even more complex the task of text line extraction.

More generally, any delayed stroke for correcting or completing previously input text handwriting may lead to a break in the temporal order, thereby increasing the risk of errors in the process of text line extraction.

Considering that text handwriting is sometimes poorly input by users (e.g. because of a too high handwriting speed or a handwriting style difficult to recognize), known handwriting recognition systems are subject to non-reliable text line extraction. In particular, poor positioning of diacritics, punctuation marks or the like (i.e. by associating a stroke to a wrong text line) may negatively affect text handwriting recognition, and thus undermine the global user experience.

There is thus a need for a solution allowing efficient and reliable text line extraction in a computing device, in particular for text handwriting which is input in a free handwriting mode, to avoid that input strokes (diacritics, punctuation marks or the like) are associated with an inappropriate text line.

SUMMARY

The examples of the present invention that are described herein below provide computing devices, methods and corresponding computer programs for performing text line extraction.

According to a particular aspect, the invention provides a method for processing text handwriting on a computing device, the computing device comprising a processor, a memory and at least one non-transitory computer readable medium for recognizing input under control of the processor, the method comprising: displaying, in a display area, strokes of digital ink which are input substantially along a handwriting orientation; performing text line extraction to extract text lines from said strokes, said text line extraction comprising: slicing said display area into strips extending transversally to the handwriting orientation, wherein adjacent strips partially overlap with each other so that each stroke is contained in at least two adjacent strips; ordering, for each strip, the strokes at least partially contained in said strip to generate a first timely-ordered list of strokes arranged in a temporal order and at least one first spatially-ordered list of strokes ordered according to at least one respective spatial criterion, thereby forming a first set of ordered lists; forming, for each strip, a second set of ordered lists comprising a second timely-ordered list of strokes and at least one second spatially-ordered list of strokes by filtering out strokes below a size threshold from said first timely-ordered list and from said at least one first spatially-ordered list respectively; performing a neural net analysis to determine as a decision class, for each pair of consecutive strokes in each ordered list of said first and second set, whether the strokes of said pair belong to a same text line, in association with a probability score for said decision class; selecting, for each pair of consecutive strokes included in at least one ordered list of said first and second sets, the decision class determined with the highest probability score during the neural net analysis; and defining text lines by combining strokes into line hypotheses based on the decision class with highest probability score selected for each pair of consecutive strokes.

As indicated earlier, line extraction is a key step in text recognition and it may not always produce satisfactory results, especially regarding some types of strokes such as diacritics, punctuation marks and the like. More generally, errors may arise during text line extraction when text handwriting is input in a non-chronological order. The present invention allows for an efficient and reliable text line extraction when handwriting recognition is performed on text handwriting by a computing device.

In a particular embodiment, said strokes of digital ink are input in a free handwriting format devoid of any handwriting guiding constraint.

In a particular embodiment, said slicing is configured so that the strips extend along a same strip orientation.

In a particular embodiment, said slicing comprises: determining a width of the strips based on the scale of the strokes; and assigning each stroke to each strip in which said stroke is at least partially contained.

In a particular embodiment, said slicing is configured so that each pair of adjacent strips partially overlap with each other to share between 50% and 85% of their respective area.

In a particular embodiment, said at least one first spatially-ordered list generated for each strip in said ordering comprises at least one of: a spatially-ordered list of strokes ordered according to the position, along the strip orientation, of the respective barycenter of each stroke of said strip; a spatially-ordered list of strokes ordered according to the outermost coordinate in a first direction along the strip orientation of each stroke of said strip; and a spatially-ordered list of strokes ordered according to the outermost coordinate in a second direction, opposite said first direction, along the strip orientation of each stroke of said strip.

In a particular embodiment, said forming a second set of ordered lists comprises, for each strip: evaluating a first size of each stroke of said strip based on at least one of a height or maximum distance in the strip orientation of said stroke and a second size of each stroke of said strip based on the length of said stroke; The length of the stroke may correspond to the length of the path defined by the stroke points; removing, from said first timely-ordered list and from said at least one first spatially-ordered list, each stroke when either said first or second size is below a size threshold, thereby generating respectively the second timely-ordered list and said at least one second spatially-ordered list.

In a particular embodiment, said neural net analysis comprises: computing, by at least one artificial classifier (e.g. neural net), probability scores representing the probability that the strokes, in each pair of consecutive strokes included in the ordered lists of said first and second sets of ordered lists, belong to a same text line; determining, as a decision class for each pair of consecutive strokes, that the strokes of said pair belong to a same text line if the probability score reaches at least a probability threshold.

In a particular embodiment, said at least one artificial classifier or neural net analyses sequentially each pair of consecutive strokes in each ordered list of said first and second sets to determine the respective decision class and probability score, based on spatial and temporal information related to the strokes in said ordered list.

In a particular embodiment, said selecting comprises: compiling into a probability matrix the selected decision class, in association with the respective probability score, for each pair of consecutive strokes included in at least one ordered list of said first and second sets.

In a particular embodiment, said defining text lines comprises: transforming the probability matrix into a vector list of entries including the decision class and associated probability score for each pair of consecutive strokes included in said probability matrix, said vector list being arranged according to an order of decreasing value of the probability scores of each pair; and determining sequentially for each pair of consecutive strokes in the vector list, from the highest to lowest associated probability score, a line hypothesis assigned to said pair of consecutive strokes, wherein each line hypothesis comprises at least one stroke of a same text line, wherein each line hypothesis obtained, once all strokes of the vector list have been assigned to a respective line hypothesis, defines a respective text line.

In a particular embodiment, during said defining text lines, the two strokes of a pair of consecutive strokes included in the vector list are combined into a same line hypothesis corresponding to a same text line if the decision class previously selected with the highest probability score for said pair indicates that the two consecutive strokes belong to a same text line and if said highest probability score reaches at least a final threshold.

In a particular embodiment, said defining text lines comprises: selecting a pair of consecutive strokes included in the vector list, namely a first and second stroke belonging respectively to a first and second line hypothesis, wherein at least one of the first and second line hypotheses comprises at least two strokes. Upon detecting that the first and second strokes of said pair belong to a same text line with a highest probability score reaching at least the final threshold, the computing device performs a decision process comprising: computing a first line score of the first line hypothesis based on the probability scores of each pair of consecutive strokes already assigned to the first line hypothesis, said first line score representing a likelihood that each stroke of said first line hypothesis are part of a first text line; computing a second line score of the second line hypothesis based on the probability scores of each pair of consecutive strokes already assigned to the second line hypothesis, said second line score representing a likelihood that each stroke of said second line hypothesis are part of a second text line; computing a third line score based on the probability scores of each pair of consecutive strokes assigned to a third line hypothesis combining each stroke of the first and second line hypotheses, said third line score representing the likelihood that each stroke of said first and second line hypotheses form together a third text line; and determining whether the first and second line hypothesis are merged into said third line hypothesis based on a comparison of a sum of the first and second line score with the third line score.

In a particular embodiment, the method further comprises: ordering all the strokes in the display area to generate a third timely-ordered list of strokes arranged in a temporal order; and forming a fourth timely-ordered list of strokes by filtering out strokes below a size threshold from said first third timely-ordered list; wherein said neural net analysis comprises determining as a decision class, for each pair of consecutive strokes in said third and fourth timely-ordered lists, whether the strokes of said pair belong to a same text line, in association with a probability score for said decision class; and wherein during said selecting, the decision class determined with the highest probability score during the neural net analysis is selected for each pair of consecutive strokes included in at least one of the ordered lists of said first and second sets, the third timely-ordered list and the fourth timely-ordered list.

According to another aspect, the present inventions relates to A non-transitory computer readable medium having a computer readable program code embodied therein, said computer readable program code adapted to be executed to implement a method for processing text handwriting on a computing device, the computing device comprising a processor, a memory and at least one non-transitory computer readable medium for recognizing input under control of the processor, the method comprising: displaying, in a display area, strokes of digital ink which are input substantially along a handwriting orientation; performing text line extraction to extract text lines from said strokes, said text line extraction comprising: slicing said display area into strips extending transversally to the handwriting orientation, wherein adjacent strips partially overlap with each other so that each stroke is contained in at least two adjacent strips; ordering, for each strip, the strokes at least partially contained in said strip to generate a first timely-ordered list of strokes arranged in a temporal order and at least one first spatially-ordered list of strokes ordered according to at least one respective spatial criterion, thereby forming a first set of ordered lists; forming, for each strip, a second set of ordered lists comprising a second timely-ordered list of strokes and at least one second spatially-ordered list of strokes by filtering out strokes below a size threshold from said first timely-ordered list and from said at least one first spatially-ordered list respectively; performing a neural net analysis to determine as a decision class, for each pair of consecutive strokes in each ordered list of said first and second set, whether the strokes of said pair belong to a same text line, in association with a probability score for said decision class; selecting, for each pair of consecutive strokes included in at least one ordered list of said first and second sets, the decision class determined with the highest probability score during the neural net analysis; and defining text lines by combining strokes into line hypotheses based on the decision class with highest probability score selected for each pair of consecutive strokes.

The computer program of the invention can be expressed in any programming language, and can be in the form of source code, object code, or any intermediary code between source code and object code, such that in a partially-compiled form, for instance, or in any other appropriate form.

The invention also provides a computer program as mentioned above.

The non-transitory computer readable medium previously mentioned can be any entity or device capable of storing the computer program. For example, the recording medium can comprise a storing means, such as a ROM memory (a CD-ROM or a ROM implemented in a microelectronic circuit), or a magnetic storing means such as a floppy disk or a hard disk for instance.

The non-transitory computer readable medium of the invention can correspond to a transmittable medium, such as an electrical or an optical signal, which can be conveyed via an electric or an optic cable, or by radio or any other appropriate means. The computer program according to the disclosure can in particular be downloaded from the Internet or a network of the like.

Alternatively, the non-transitory computer readable medium can correspond to an integrated circuit in which a computer program is loaded, the circuit being adapted to execute or to be used in the execution of the methods of the invention.

In a particular embodiment, the invention relates to a non-transitory computer readable medium having a computer readable program code embodied therein, said computer readable program code being adapted to be executed to implement a method for hand-drawing input elements on a computing device as defined in the present document, the computing device comprising a processor for executing the steps of said method.

The present invention also relates to a computing device suitable to implement the method as defined in the present disclosure. More particularly, the present invention provides a computing device for processing handwriting text, comprising: a display unit for displaying, in a display area, strokes of digital ink which are input substantially along an handwriting orientation; a line extraction unit for performing text line extraction to extract text lines from said strokes. The line extraction unit comprises: a slicing module for slicing said display area into strips extending transversally to the handwriting orientation, wherein adjacent strips partially overlap with each other so that each stroke is contained in at least two adjacent strips; an ordering module for ordering, for each strip, the strokes at least partially contained in said strip to generate a first timely-ordered list of strokes arranged in a temporal order and at least one first spatially-ordered list of strokes ordered according to at least one respective spatial criterion, thereby forming a first set of ordered lists; a forming module for forming, for each strip, a second set of ordered lists comprising a second timely-ordered list of strokes and at least one second spatially-ordered list of strokes by filtering out strokes below a size threshold from said first timely-ordered list and from said at least one first spatially-ordered list respectively; a neural net module for performing a neural net analysis to determine as a decision class, for each pair of consecutive strokes in each ordered list of said first and second set, whether the strokes of said pair belong to a same text line, in association with a probability score for said decision class; a selecting module for selecting, for each pair of consecutive strokes included in at least one ordered list of said first and second sets, the decision class determined with the highest probability score during the neural net analysis; and a line definition module for defining text lines by combining strokes into line hypotheses based on the decision class with highest probability score selected for each pair of consecutive strokes.

The various embodiments defined above in connection with the method of the present invention apply in an analogous manner to the computing device, the computer program and the non-transitory computer readable medium of the present disclosure.

For each step of the method of the present invention as defined in the present disclosure, the computing device may comprise a corresponding module configured to perform said step.

In a particular embodiment, the disclosure may be implemented using software and/or hardware components. In this context, the term "unit" and "module" can refer in this disclosure to a software component, as well as a hardware component or a plurality of software and/or hardware components.

BRIEF DESCRIPTION OF THE DRAWINGS

Other characteristics and advantages of the present disclosure will appear from the following description made with reference to the accompanying drawings, which show embodiments having no limiting character. In the figures:

Figures 2A, 2B:
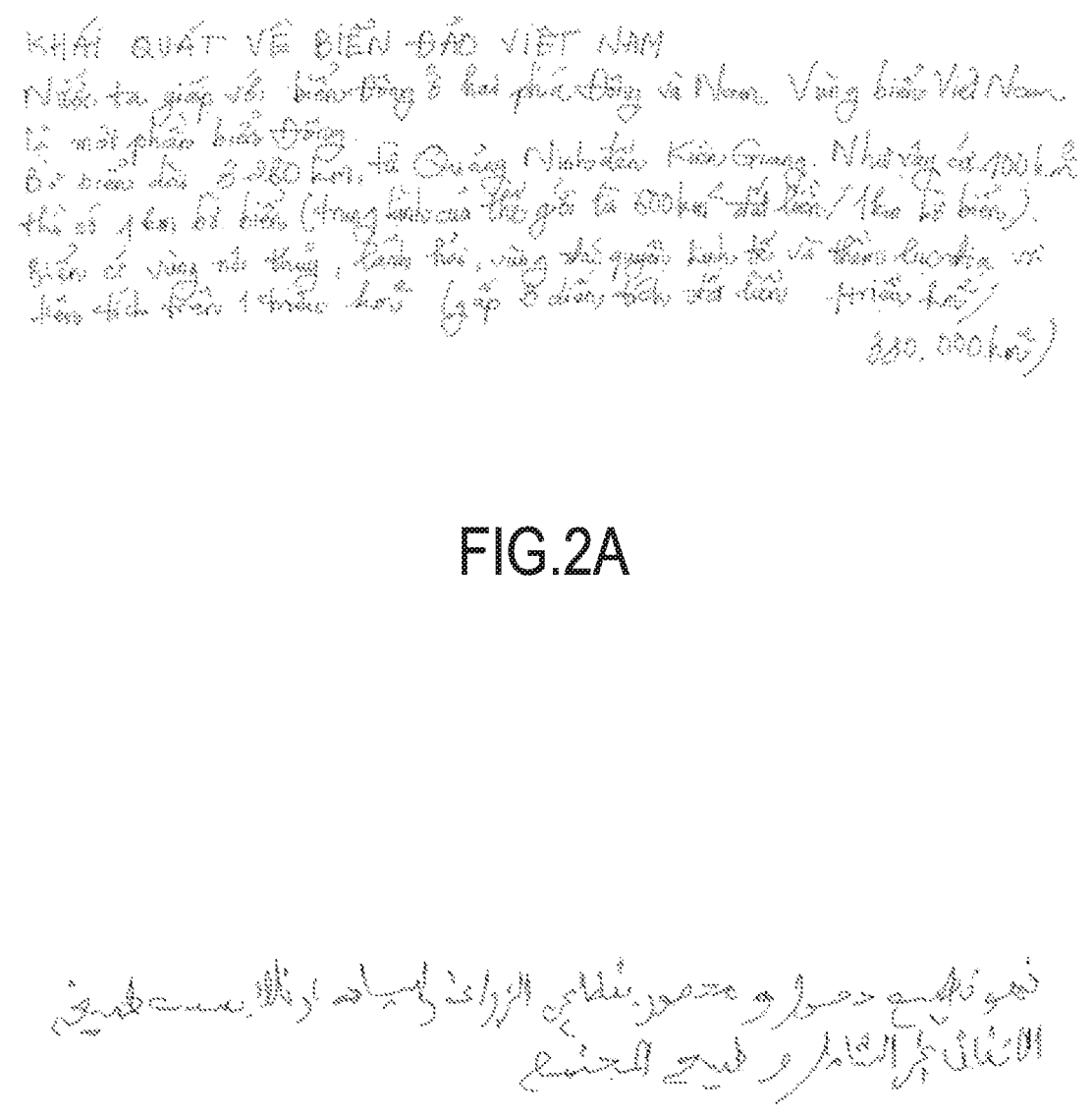

FIGS. 2A-2B show examples of text handwriting in different languages;

Figure 1A:
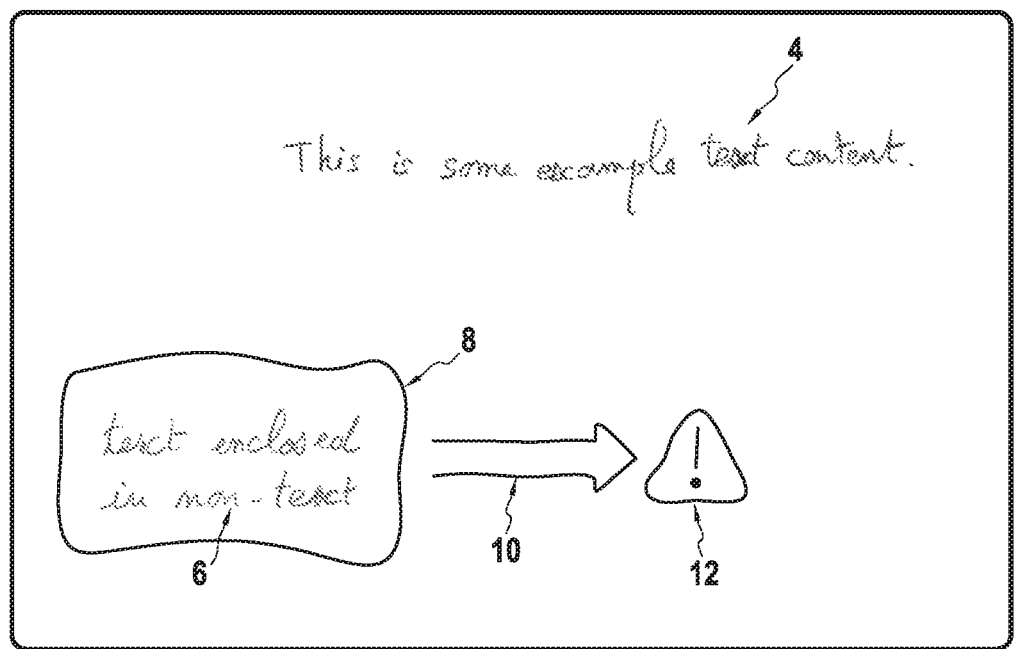
FIGS. 1A-1B represent a process of text handwriting recognition.
Figure 1B:
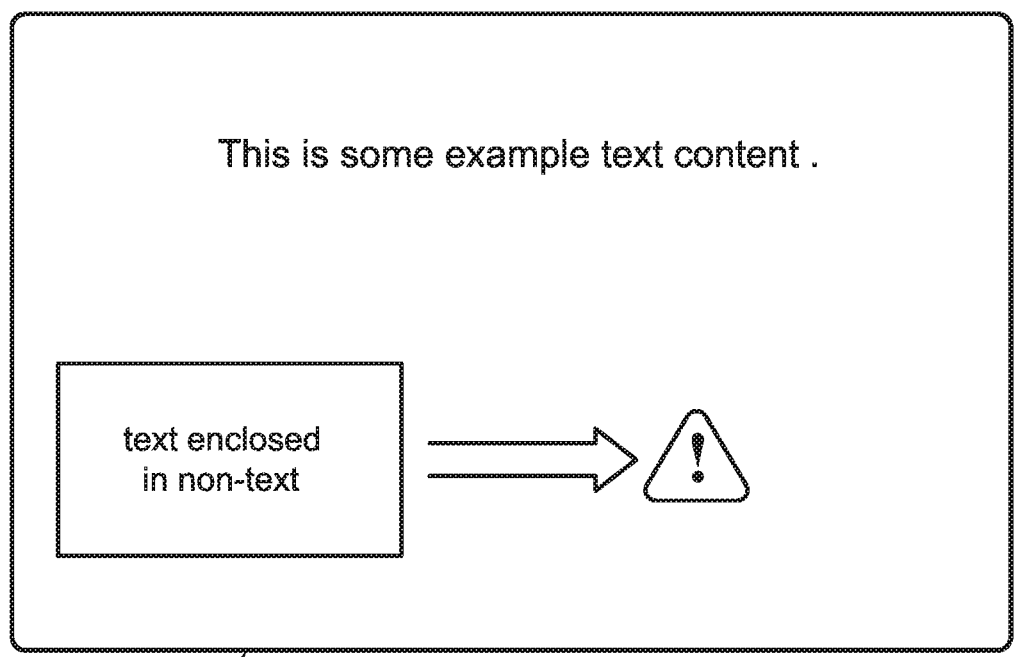

The components in the figures are not necessarily to scale, emphasis instead being placed upon illustrating the principles of the present invention.

For simplicity and clarity of illustration, the same reference signs will be used throughout the figures to refer to the same or analogous parts, unless indicated otherwise.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known method, procedures, and/or components are described at a relatively high-level, without detail, in order to avoid unnecessarily obscuring aspects of the present teachings.

The following description of the exemplary embodiments refers to the accompanying drawings. The following detailed description does not limit the invention. Instead, the scope of the invention is defined by the appended claims. In various embodiments as illustrated in the figures, a computing device, a corresponding method and a corresponding computer program are discussed.

The use of the term "text" in the present description is understood as encompassing all characters (e.g. alphanumeric characters or the like), and strings thereof, in any written language and any symbols used in written text.

The term "non-text" in the present description is understood as encompassing freeform handwritten or hand-drawn content (e.g. shapes, drawings, etc.) and image data, as well as characters, and string thereof, or symbols which are used in non-text contexts. Non-text content defines graphic or geometric formations in linear or non-linear configurations, including containers, drawings, common shapes (e.g. arrows, blocks, etc.) or the like. In diagrams for instance, text content may be contained in a shape (a rectangle, ellipse, oval shape . . . ) called containers.

Furthermore, the examples shown in these drawings are in a left-to-right written language context, and therefore any reference to positions can be adapted for written languages having different directional formats.

The various technologies described herein generally relate to processing handwritten text content on portable and non-portable computing devices, more particularly for the purpose of text line extraction. The systems and methods described herein may utilize recognition of user's natural handwriting styles input to a computing device via an input surface, such as a touch sensitive screen (as discussed later). Whilst the various embodiments are described with respect to recognition of digital ink handwriting input using so-called online recognition techniques, it is understood that other forms of input for recognition may be applied, such as offline recognition involving a remote device or server to perform recognition.

The terms "hand-drawing" and "handwriting" are used interchangeably herein to define the creating of digital contents (handwriting input) by users through use of their hands (or fingers) or an input device (hand-held stylus or digital pen, mouse, etc.) on or with an input surface. The term "hand" or the like is used herein to provide concise description of the input techniques, however the use of other parts of a user's body for similar input is included in this definition, such as foot, mouth and eye.

As described in more details below, an aspect of the present invention implies detecting strokes of digital ink and performing text line extraction to extract text lines from the detected strokes. These strokes may be displayed in a display area. The text line extraction involves slicing the digital strokes into strips (or slices, or bands), ordering for each strip the strokes into ordered lists which form collectively a first set of ordered lists, forming for each strip a second set of ordered lists by filtering out from the ordered lists of the first set strokes which are below a given size threshold, and performing a neural net analysis based on said first and second sets to determine for each stroke a respective text line to which it belongs.

Figure 3:
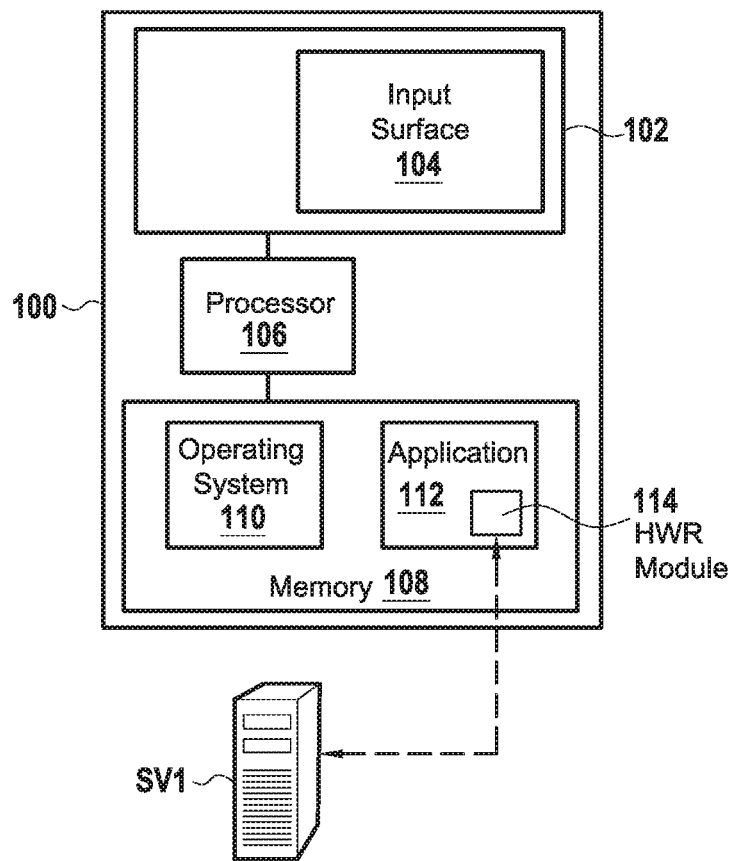
FIG. 3 depicts schematically a computing device according to a particular embodiment of the present invention.

FIG. 3 shows a block diagram of a computing device 100 according to a particular embodiment of the present invention. The computing device (or digital device) 100 may be a computer desktop, laptop computer, tablet computer, e-book reader, mobile phone, smartphone, wearable computer, digital watch, interactive whiteboard, global positioning system (GPS) unit, enterprise digital assistant (EDA), personal digital assistant (PDA), game console, or the like. The computing device 100 includes components of at least one processing elements, some form of memory and input and output (I/O) devices. The components communicate with each other through inputs and outputs, such as connectors, lines, buses, links networks, or others known to the skilled person.

More specifically, the computing device 100 comprises an input surface 104 for handwriting (or hand-drawing) text content, or possibly mixt content (text and non-text), as described further below. More particularly, the input surface 104 is suitable to detect a plurality of input strokes of digital ink entered on (or using) said input surface. As also discussed further below, these input strokes may be input in a free handwriting format (or in a free handwriting mode), that is, without any handwriting constraint of position, size and orientation in an input area.

The input surface 104 may employ technology such as resistive, surface acoustic wave, capacitive, infrared grid, infrared acrylic projection, optical imaging, dispersive signal technology, acoustic pulse recognition, or any other appropriate technology as known to the skilled person to receive user input in the form of a touch- or proximity-sensitive surface. The input surface 104 may be a non-touch sensitive surface, which is monitored by a position detection system.

The computing device 100 also comprises at least one display unit (or display device) 102 for outputting data from the computing device such as text content. The display unit 102 may be a screen or the like of any appropriate technology (LCD, plasma, etc.). The display unit 102 is suitable to display strokes of digital ink input by a user.

The input surface 104 may be co-located with the display unit 102 or remotely connected thereto. In a particular example, the display unit 102 and the input surface 104 are parts of a touchscreen.

As depicted in FIG. 3, the computing device 100 further comprises a processor 106 and a memory 108. The computing device 100 may also comprise one or more volatile storing elements (RAM) as part of the memory 108 or separate thereof.

The processor 106 is a hardware device for executing software, particularly software stored in the memory 108. The processor 108 can be any custom made or general purpose processor, a central processing unit (CPU), a semiconductor based microprocessor (in the form of microchip or chipset), a microcontroller, a digital signal processor (DSP), an application specific integrated circuit (ASIC), field programmable gate array (FPGA) or other programmable logic device, or any combination thereof, and more generally any appropriate processor component designed for executing software instructions as known to the skilled person.

The memory 108 is a non-transitory (or non-volatile) computer readable medium (or recording medium) in accordance with a particular embodiment of the disclosure. The memory 108 may include any combination of non-volatile storing elements (e.g. ROM, EPROM, flash PROM, EEPROM, hard drive, magnetic or optical tape, memory registers, CD-ROM, WORM, DVD, or the like).

The memory 108 may be remote from the computing device 100, such as at a server or cloud-based system, which is remotely accessible by the computing device 100. The non-volatile memory 108 is coupled to the processor 106, so that the processor 106 is capable of reading information from and writing information to the memory 108. As an alternative, the memory 108 is integral to the computing device 100.

The memory 108 includes an operating system (OS) 110 and a handwriting application (or computer program) 112. The operating system 110 controls the execution of the application 112. The application 112 constitutes (or comprises) a computer program (or computer-readable program code) according to a particular embodiment of the invention, this computer program comprising instructions to implement a method according to a particular embodiment of the invention.

In the present embodiment, the application 112 includes instructions for detecting and managing strokes of digital ink handwritten by a user using the input surface 104 of the computing device 100, as discussed further below.

The application 112 may comprise a handwriting recognition (HWR) module (or HWR system) 114 for recognizing text handwriting input to the computing device 100. The HWR 114 may be a source program, an executable program (object code), script, application, or any other component having a set of instructions to be performed. In the present example depicted in FIG. 3, the application 112 and the HWR module 114 are combined in a single application (the HWR module 114 is part of the application 112). Alternatively, the HWR module 114 may be a module, method or system for communicating with a handwriting recognition system remote from the computing device 100, such as a server (or cloud-based system) SV1 as depicted in FIG. 3 which is remotely accessible by the computing device 100 through an appropriate communication link. The application 112 and the HWR module 114 may also be separate components stored in the memory 108 (or in different memories) of the computing device 100, whereby the application 112 and the HWR module 114 operate together accessing information processed and stored in the memory 108.

A user may enter an input stroke with a hand or finger, or with some input instrument such as a digital pen or stylus suitable for use with the input surface 104. The user may also enter an input stroke by making a gesture above the input surface 104 if means configured to sense motions in the vicinity of the input surface 104 is being used, or with a peripheral device of the computing device 100, such as a mouse or a joystick or the like.

Each ink input element (letters, symbols, words etc.) is formed by one or a plurality of input strokes or at least by a portion of a stroke. A stroke (or input stroke) is characterized by at least a stroke initiation location (corresponding to a "pen down" event), a stroke terminal location (corresponding to a "pen up" event), and the path connecting the stroke initiation and the stroke terminal locations. Because different users may naturally write or hand-draw a same object (e.g. letter, shape, symbol, etc.) with slight variations, the HWR module 114 accommodates a variety of ways in which each object may be entered whilst being still recognized as the correct or intended object.

The handwriting application 112 allows generating handwritten or hand-drawn text content in digital ink form and have this content faithfully recognized using the HWR module 114. In particular cases, the application 112 may be configured to detect and recognize text content based on mixed content which contains text and non-text content (e.g., diagrams, charts, etc.).

The nature and implementation of the recognition process performed by the HWR module 114 may vary depending on each case. Text recognition may be performed either fully locally on the computing device 100 or at least partially remotely using for instance the remote server SV1 (FIG. 3). An example of implementing handwriting recognition can for instance be found in U.S. Patent Application Publication No. 2017/0109578 A1. In particular, as is known to the skilled person, text recognition may be performed based on any one of language model(s) (e.g., grammar, semantics), linguistic information including text-based lexicon(s) (regular expressions, etc.) or the like, and statistical information modelling for how frequent a given sequence of elements appears in the specified language or is used by a specific user.

In the present embodiment, the computing device 100 is configured to detect and display text handwriting which is input using the input surface 104 in a free handwriting format (or free handwriting mode), that is, without any handwriting constraint of position, size and orientation of the text handwriting input. The free handwriting mode allows a user to handwrite input elements in a free environment (e.g. in a blank zone) in an unstructured or unguided fashion, that is, without any handwriting constraint of position, size and orientation of the text handwriting input (no line pattern to follow, no limitation of size or orientation, no constraint of interline, margin or the like, etc.). This free handwriting format affords complete freedom to the user during handwriting input, which is sometimes desirable for instance to take quick and miscellaneous notes or make mixed input of text and non-text.

Figure 4:
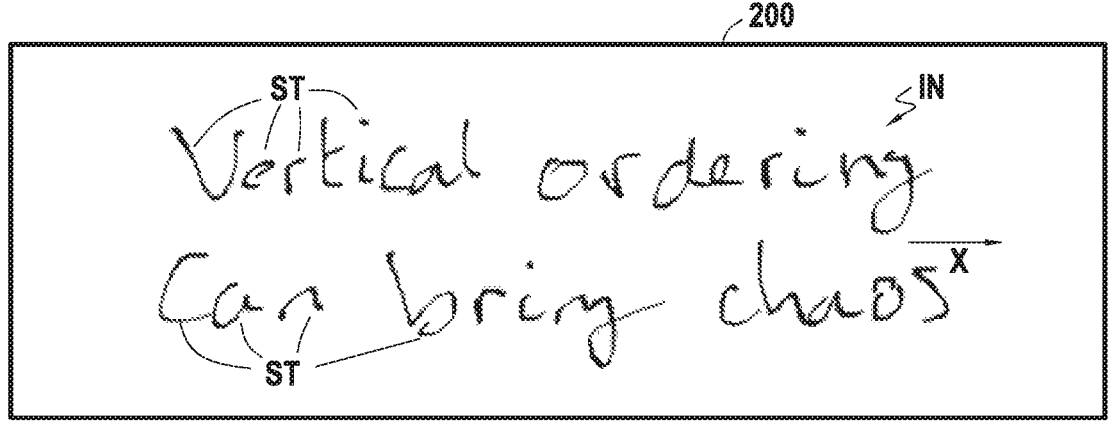
FIG. 4 represents text handwriting input on a computing device.

As shown in FIG. 4, the display unit 102 of the computing device 100 is configured to display, in a display area (or input area) 200, text handwriting IN formed by a plurality of strokes (or input strokes) ST of digital ink. In the examples described hereafter, it is assumed that the detected strokes ST are input along (or substantially along) a same handwriting orientation X (e.g. the horizontal orientation in the present case). Variations of handwriting orientations, e.g. deviations from an intended orientation within the same line, may however be possible in some cases. Text handwriting IN may of course take many different forms and styles, depending on each case. It will be assumed in the following examples that the handwritten characters corresponding to the phrase "Vertical ordering can bring chaos" is detected and displayed as text handwriting input in the display area 200, although numerous other types and content of text handwriting are possible, notably in terms of language, style etc.

It the following examples, it is further assumed that the text handwriting IN is input in the free handwriting mode (or format) as described above.

Figure 5:
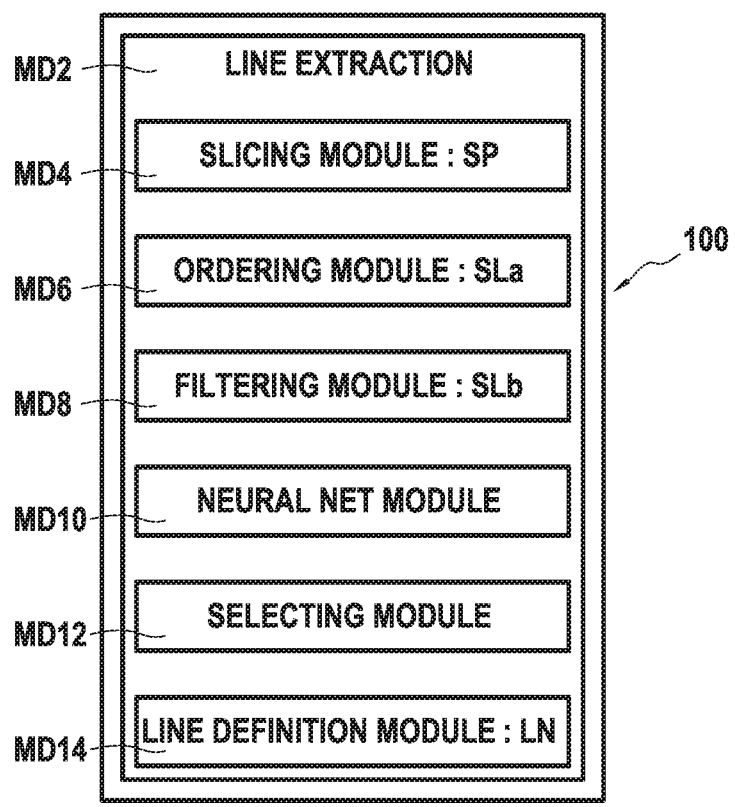
FIG. 5 is a block diagram representing schematically modules implemented by the computing device of FIG. 3, according to a particular embodiment of the invention.

As shown in FIG. 5 according to a particular embodiment, when running the application 112 stored in the memory 108 (FIG. 3), the processor 106 implements a line extraction unit (also called line extractor) MD2 comprising a number of processing modules, that is: a slicing module MD4, an ordering module MD6, a filtering module MD8, a neural net analysis module MD10, a selecting module MD12 and a line definition module MD14.

The application 112 comprises instructions configuring the processor 106 to implement these modules in order to perform steps of a method of the invention, as described later in particular embodiments. The line extraction unit MD2 is suitable to define text lines LN such that each input stroke ST detected by the computing device 100 is associated with a respective text line LN.

More particularly, the slicing module MD4 is configured to slice a display area (i.e. display area 200 as shown in FIG. 4) into strips (also called slices or bands) SP extending transversally to the handwriting orientation X. This slicing may be performed such that adjacent strips SP partially overlap with each other so that each stroke ST is contained in at least two adjacent strips SP.

The ordering module MD6 is configured to order, for each strip SP, the strokes ST at least partially contained in said strip SP to generate a first timely-ordered list of strokes arranged in a temporal order and at least one first spatially-ordered list of strokes ordered according to at least one respective spatial criterion, thereby forming a first set SLa of ordered lists. As discussed further below, various spatial criteria may be used to generate one or more first spatially-ordered list of strokes.

The forming module MD8 is configured to form, for each strip SP, a second set SLb of ordered lists comprising a second timely-ordered list of strokes and at least one second spatially-ordered list of strokes by filtering out strokes ST below a size threshold from respectively the first timely-ordered list and from the at least one first spatially-ordered list of the first set SLa.

The neural net module MD10 is configured to perform a neural net analysis to determine as a decision class, for each pair of consecutive strokes ST in each ordered list of said first set SLa and second set SLb, whether the strokes ST of said pair belong to a same text line, in association with a probability score for the decision class.

The selecting module MD12 is configured to select, for each pair of consecutive strokes ST included in at least one ordered list of said first set SLa and second set SLb, the decision class determined with the highest probability score during the neural net analysis.

The line definition module MD14 is configured to define text lines LN by combining strokes ST into line hypotheses based on the decision class with highest probability score selected for each pair of consecutive strokes.

The selecting module MD12 and the line definition module MD14 may form part of a decoder (or decoding module) implemented by the process 106 when running the application 12. A decoder is an algorithm that aims to translate an input information into a different output one. In the present context, the decoder (MD12, MD14) may use the local information that a pair of strokes belongs to a same text line with a probability P to construct gradually line hypotheses, as further described below. The decoding process may define these probabilities P as local rules to construct the line hypotheses and a decision process (combining locally a set of probabilities P) to control the validity of line hypothesis construction rules. After combining all the local probabilities, the final line hypotheses are the final text lines.

The configuration and operation of the modules MD4-MD14 of the computing device 100 will be more apparent in the particular embodiments described hereinbelow with reference to the figures. It is to be understood that the modules MD4-MD14 as shown in FIG. 5 represent only an example embodiment of the present invention, other implementations being possible.

For each step of the method of the present invention, the computing device 100 may comprise a corresponding module configured to perform said step.

A method implemented by the computing device 100 illustrated in FIGS. 3-5 is now described with reference to FIGS. 6-17, in accordance with particular embodiments of the present invention. More specifically, the computing device 100 implements this method by executing the application 112 stored in the memory 108.

An example scenario is considered where a user inputs handwriting text IN as shown in FIG. 4 on the computing device 100. Processing is then performed by the computing device 100, including line extraction as described below.

More specifically, in a detecting step S2, the computing device 100 detects text handwriting IN input by a user using the input surface 104 of the computing device 100. As shown in FIG. 4, the handwriting input IN comprises a plurality of input strokes ST of digital ink which are input along (or substantially along) a handwriting orientation X using the input surface 104. As already indicated, each input stroke ST is characterized by at least a stroke initiation location, a stroke terminal location and the path connecting the stroke initiation and the stroke terminal locations. Accordingly, the dot positioned for instance at the top of the character "i" (in the word "Vertical") constitutes a single stroke ST by itself.

In the present example, the handwriting digital ink IN is input in an input area 200 of the display 102, according to the free handwriting format as previously described. Without any handwriting constraint of lines, size, orientation or the like to comply with, the user is allowed to handwrite text content IN in a free and easy manner. The size, orientation and position of each handwritten character or each handwritten word may vary arbitrarily depending on the user's preferences.

As shown in FIG. 4, the computing device 100 displays (S4, FIG. 6) the plurality of input strokes ST of the handwriting input IN on the display unit 102 in accordance with the free handwriting format (or mode).

Figure 6:
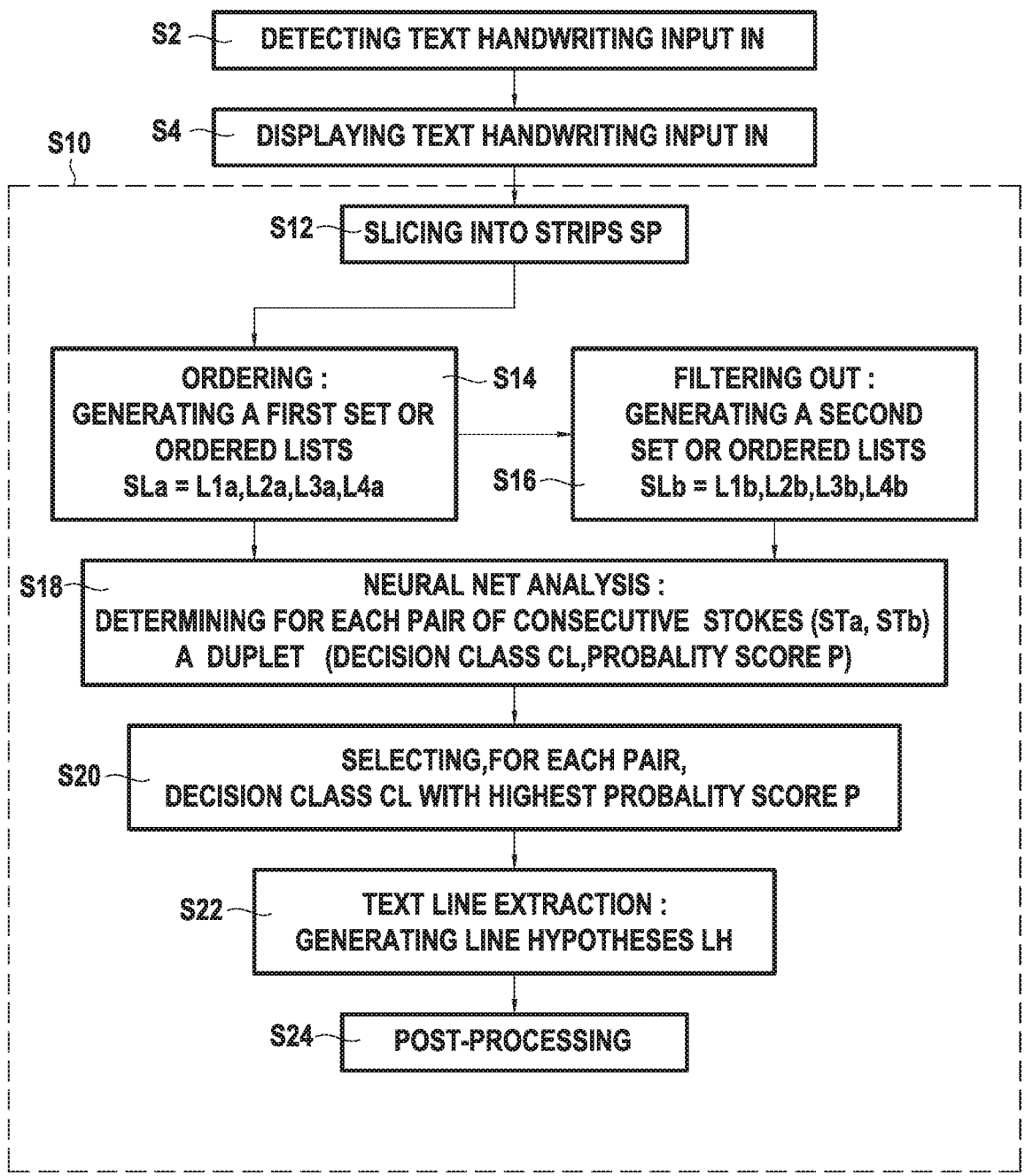
FIG. 6 is of flow diagram representing schematically steps of a method according to a particular embodiment of the present invention.

The computing device 100 then performs (S10, FIG. 6) a text line extraction to extract text lines from the strokes ST detected in the text handwriting IN. As shown in FIG. 6, the text line extraction S10 comprises the steps S12-S24 as described further below in the present example.

For a matter of simplicity, it is assumed in the present example that the entire handwriting input IN detected by the computing device 100 is text. In other cases, handwriting input IN may however comprise text and non-text content. A disambiguation process may thus be performed during text recognition by a classifier according to any suitable technique known to the skilled person to distinguish text from non-text content.

More specifically, in a slicing step S12 (FIG. 7), the computing device 100 slices the display area 200 into strips SP extending transversally to the handwriting orientation X. The slicing S12 is carried out such that adjacent strips SP partially overlap with each other, causing each stroke ST to be contained in at least two adjacent strips SP. As can be seen, many configurations of the strips SP may be adopted by the skilled person. Some implementations of the slicing S12 is provided herebelow as mere examples.

Figure 7:
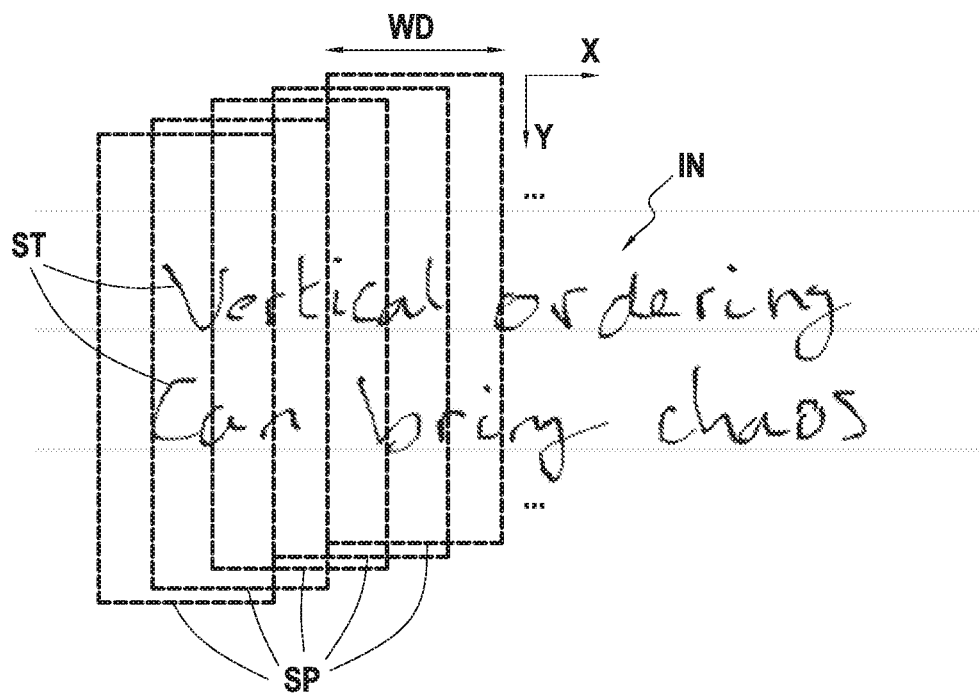
FIGS. 7 and 8 represents schematically the step of slicing text handwriting, according to particular embodiments of the invention.

In the example depicted in FIG. 7, the slicing S12 is performed such that the strips SP extend along a same strip orientation Y. As a result, the strips SP are parallel to each other. The orientation Y may be perpendicular to the handwriting orientation X (e.g. X is horizontal and Y is vertical) as shown in FIG. 7, although other configurations are possible.

The computing device 100 may thus assign each stroke ST of the text handwriting IN to at least two respective adjacent strips SP in which said stroke is at least partially contained.

As further discussed below, the slicing S12 facilitates the forthcoming neural net analysis and allows achieving an efficient text line extraction by taking decisions in different context for a same stroke ST.

Figure 8:
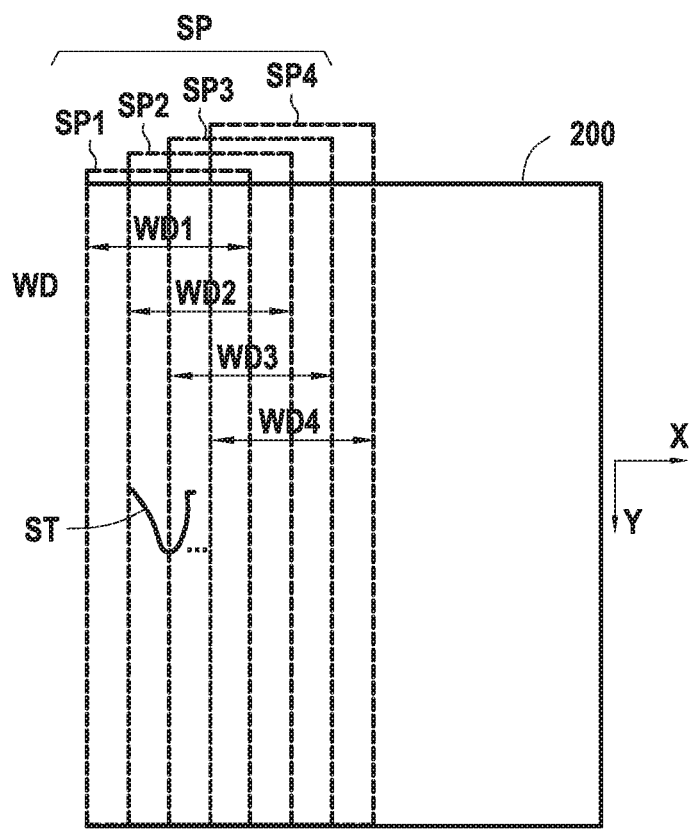

FIG. 8 shows a particular embodiment where strips SP1-SP4 are defined during the slicing step S12. For a matter of simplicity, only the first stroke ST corresponding to the first character "V" is shown. Each strip SP extends in the Y orientation, perpendicular to the handwriting orientation X. Each strip SP is formed with a respective width WD1-WD4 (referred to collectively as WD) in the X orientation. In the present example, the width WD of each strip SP is identical, although other implementations are possible. In particular, embodiments are possible where the width WD is not the same for all the strips SP.

As can be seen in FIG. 8, the strips SP partially overlap with each other such that the input stroke ST forming the first character "V" is contained at least partially in the strips SP1, SP2 and SP3. In other words, this input stroke corresponding to "V" belongs to the adjacent strips SP1, SP2 and SP3.

As discussed further below, the slicing S12 may be configured based on the scale or size of the input strokes ST of the text handwriting IN. As used herein, the term "scale" refers to an approximation of the average size or height of characters, of input strokes or of parts of input strokes. The skilled person may also adapt the proportion of overlap between each pair of adjacent strips SP to achieve a desired result in the text line extraction process. By increasing the strip overlap, results of the text line extraction process may be improved, but at a higher cost in terms of resources and time.

The computing device 100 then orders or sorts (S14, FIGS. 6 and 12), for each strip SP, the strokes ST at least partially contained in said strip SP to generate a first timely-ordered list of strokes ST arranged in a temporal order and at least one first spatially-ordered list of strokes ST ordered according to at least one respective spatial criterion, thereby forming a first set SLa of ordered lists. As discussed below, the number and type of spatial criteria used, and thus the content of the first set SLa of ordered lists, may vary depending on each case.

Figure 9:
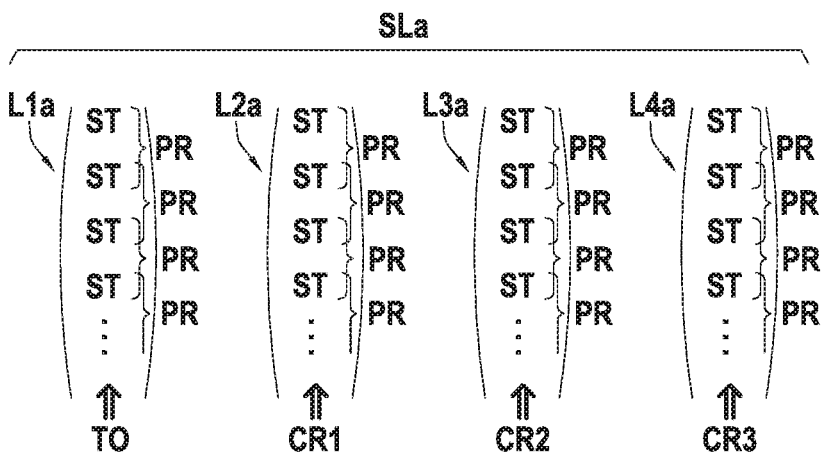
FIG. 9 represent a first set of ordered lists of vectors generated during a text line extraction, according to a particular embodiment of the invention.

As shown in FIG. 9, it is considered in the present example that, in the ordering step S14, the computing device 100 orders for each strip SP the strokes ST at least partially contained in said strip SP to generate a first timely-ordered list L1a of strokes ST arranged in a temporal order (referred to as TO) and 3 first spatially-ordered lists L2a, L3a and L4a of strokes ST ordered each according to a respective spatial criterion CR, thereby forming a first set SLa of ordered lists. As a result, a first set SLa of 4 ordered lists (L1a, L2a, L3a and L4a) is generated for each strip SP previously defined in the slicing step S12, as further described below.

The first timely-ordered list L1a comprises each stroke ST of a respective strip SP, these strokes being ordered according to their relative temporal order TO. In other words, in this list L1a, the strokes ST are arranged in a temporal sequence which is function of the time at which each stroke ST1 has been input over time.

The spatial criteria CR that may be used in the ordering step S14 (FIG. 6) to generate the first spatially-ordered lists for each strip SP are illustrated with reference to FIG. 10 which shows, by way of an example, the stroke ST corresponding to the first character "V" of the text handwriting IN detected in S2.

The first spatially-ordered lists L2a is a list of strokes ST of a respective strip SP, said strokes being ordered according to the position of their respective barycenter BY along the strip orientation Y (spatial criterion CR1). As illustrated for instance in FIG. 10, the barycenter BY of the stroke ST corresponding to the first character "V" is determined. The position along the strip orientation Y of the barycenter BY is defined by the coordinate BYy along the Y axis. For each strip SP, the coordinate BYy of the barycenter BY of each associated stroke ST is taken into account to order the strokes ST of said strip. The same operation is performed for each strip SP to generate a respective first spatially-ordered list L2a. The ordered list L2a may for instance list the strokes ST2 in an increasing (or decreasing) order of their respective position in the strip orientation Y (spatial criterion CR1).

Figure 10:
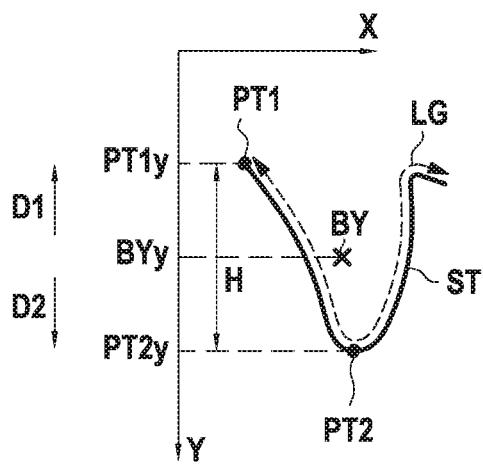
FIG. 10 represents schematically a stroke with some geometric descriptors thereof, according to a particular embodiment of the invention.

As also illustrated in FIG. 10, other spatial criteria CR2 and CR3 based on the position along the strip orientation Y of some specific points of each stroke ST may be used for generating the first spatially-ordered lists L3a and L4a.

The spatially-ordered list L3a is a list of strokes ST of a respective strip SP, the strokes being ordered according to their outermost coordinate PT1y in a first direction D1 along the strip orientation Y (spatial criterion CR2). In other words, in the list L3a, the outermost point PT1 of each stroke ST in the first direction D1 along the strip orientation Y is determined and the coordinate PT1y of this outermost point PT1 on the Y axis is determined and used to generate the spatially-ordered list L3a.

The spatially-ordered list L4a is a list of strokes ST of a respective strip SP, the strokes being ordered according to their outermost coordinate PT2y in a second direction D2, opposite the first direction D1, along the strip orientation Y (spatial criterion CR3). In other words, in the list L4a, the outermost point PT2 of each stroke ST in the second direction D2 along the strip orientation Y is determined and the coordinate PT2y of this outermost point PT2 on the Y axis is determined and used to generate the spatially-ordered list L4a.

As indicated above, the computing device 100 generates in the present example the 3 first spatially-ordered lists L2a, L3a and L4a as described above, along with the first timely-ordered list L1a, in the ordering step S14. However, in the ordering step S14, the computing device 100 may generate any one of the first spatially-ordered lists L2a, L3a and L4a as described above, or a combination thereof (e.g. only L2a, or only L3a and L4), along with the first timely-ordered list L1a. It has been observed that high performances of the text line extraction process is achieved when a temporal order TO and at least one spatial criterion CR are used to generate respective ordered lists of strokes.

As discussed further below, by generating different orders of strokes for each strip, the problem of text line definition can be efficiently analyzed and broken down through different points of view, using different complementary criteria (temporal and spatial), to find for various pairs of strokes the best decision in the text line extraction process. Combining a temporal criterion TO with at least one spatial criterion CR allows improving significantly the performances of the text line extraction.

Once the ordering step S14 is completed, the computing device 100 forms (S16, FIGS. 6 and 12), for each strip SP, a second set SLb of ordered lists comprising a second timely-ordered list of strokes and at least one second spatially-ordered list of strokes by filtering out strokes ST below a size threshold from respectively the first timely-ordered list L1a and from each first spatially-ordered list generated in the ordering step S14.

Figure 11:
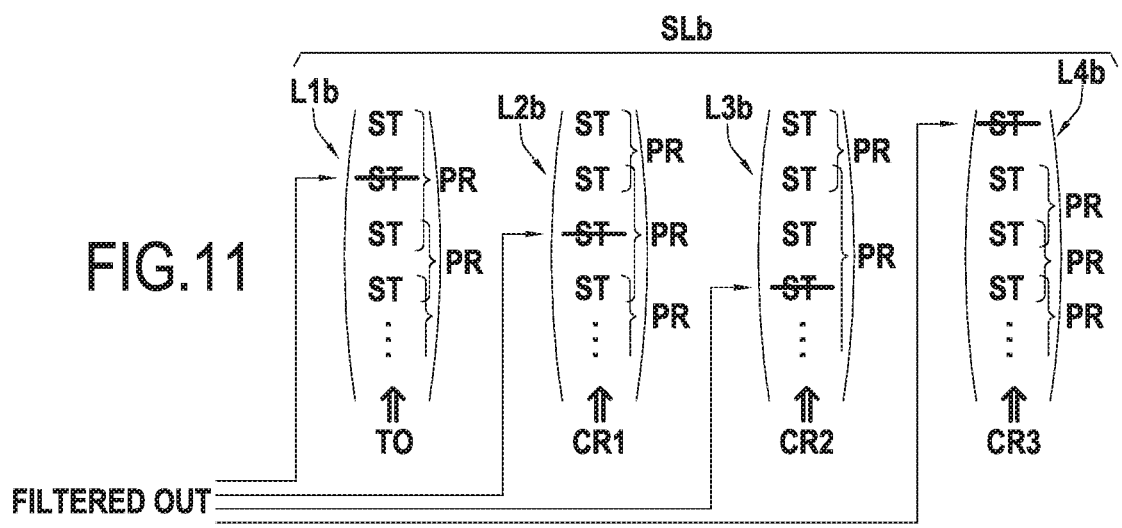
FIG. 11 represent a second set of ordered lists of vectors generated during a text line extraction, according to a particular embodiment of the invention.

As already described above, it is considered in the present example that the first timely-ordered list L1a and the first spatially-ordered lists L2a, L3a and L4a are generated in the ordering step S14. As a result, as shown in FIG. 11, the computing device 100 forms (S16) for each strip SP a second set SLb of ordered lists comprising a second timely-ordered list L1b of strokes and 3 second spatially-ordered lists L2b, L3b and L4b of strokes by filtering out strokes ST below a size threshold from respectively the first timely-ordered list L1a and from the first spatially-ordered lists L2a, L3a and L4a in S14.

In a particular embodiment illustrated in FIG. 10, during the forming (or filtering) step S16 (FIG. 6), the computing device 100 performs the following, for each strip SP defined in S12:

evaluating a first size of each stroke ST of said strip SP based on a height (or maximum distance) H in the strip orientation Y of said stroke and a second size of each stroke ST of said strip SP based on the length LG of said stroke ST; and removing, from the first timely-ordered list L1a and from the at least one first spatially-ordered list generated in S14 (i.e. the spatially-ordered lists L2a-L4a in the present example), each stroke ST when either its first or second size is below a size threshold, thereby generating respectively the second timely-ordered list L1b and at least one second spatially-ordered list (i.e. the spatially-ordered lists L2b-L4b in the present example).

In other words, each stroke ST is excluded from the second timely-ordered list L1b and from the second spatially-ordered lists L2b-L4b if at least one of its respective first size and second size does not reach a size threshold.

As shown in FIG. 11, in the forming step S16, a plurality of strokes ST (or at least one assuming at least one stroke does not reach the aforementioned size threshold) are thus removed from the ordered lists of the first set SLa to obtain the ordered-lists of the second set SLb. The strokes ST which are filtered out from the ordered lists L1a-L4a of the first set SLa are selected based on their respective size: each stroke below a predefined size threshold is removed. In other words, all the strokes which do not meet a predetermined condition of size (defined by a maximum size threshold relative to the scale) is discarded from the ordered lists of the first set SLa to obtain the second set SLb.

In a particular example, the computing device 100 evaluates only one of the first size and second size to decide which strokes ST should be filtered out from the first set SLa in the forming step S16.

This step S16 of filtering out is designed to remove all the relatively small strokes from the ordered lists of the first set SLa, such as diacritics, punctuation marks, apostrophes, etc. which may cause problems or errors in the process of text line identification. A diacritic (also diacritical sign or accent) is a glyph (sign, mark, etc.) added or attached to a letter or character to distinguish it from another of similar form, to give it a particular phonetic value, to indicate stress, etc. (as a cedilla, tilde, circumflex, or macron). By generating a second set SLb of ordered lists devoid of such relatively small strokes ST, the performances of the text line extraction process can be improved. As already indicated, it can be difficult to determine to which text line belong the relatively small strokes corresponding to diacritics, punctuation marks or the like. By using this second set SLb in combination with the first set SLa, reliable decision can be made during text line extraction regarding these small strokes.

As shown in FIGS. 9 and 11, each or the ordered lists L1a-L4a and L1b-L4b of the first and second sets SLa, SLb comprises a sequence of strokes ST which form pairs PR of consecutive strokes (also referred to hereafter as pairs PR). A given pair PR can be defined as a duplet (STa, STb) of two consecutive strokes—referred to more specifically as STa and STb—in one of the ordered lists of the first and second sets SLa, SLb (FIG. 6). A same pair PR may be present in more than one ordered list within the sets SLa, SLb.

Figure 12:
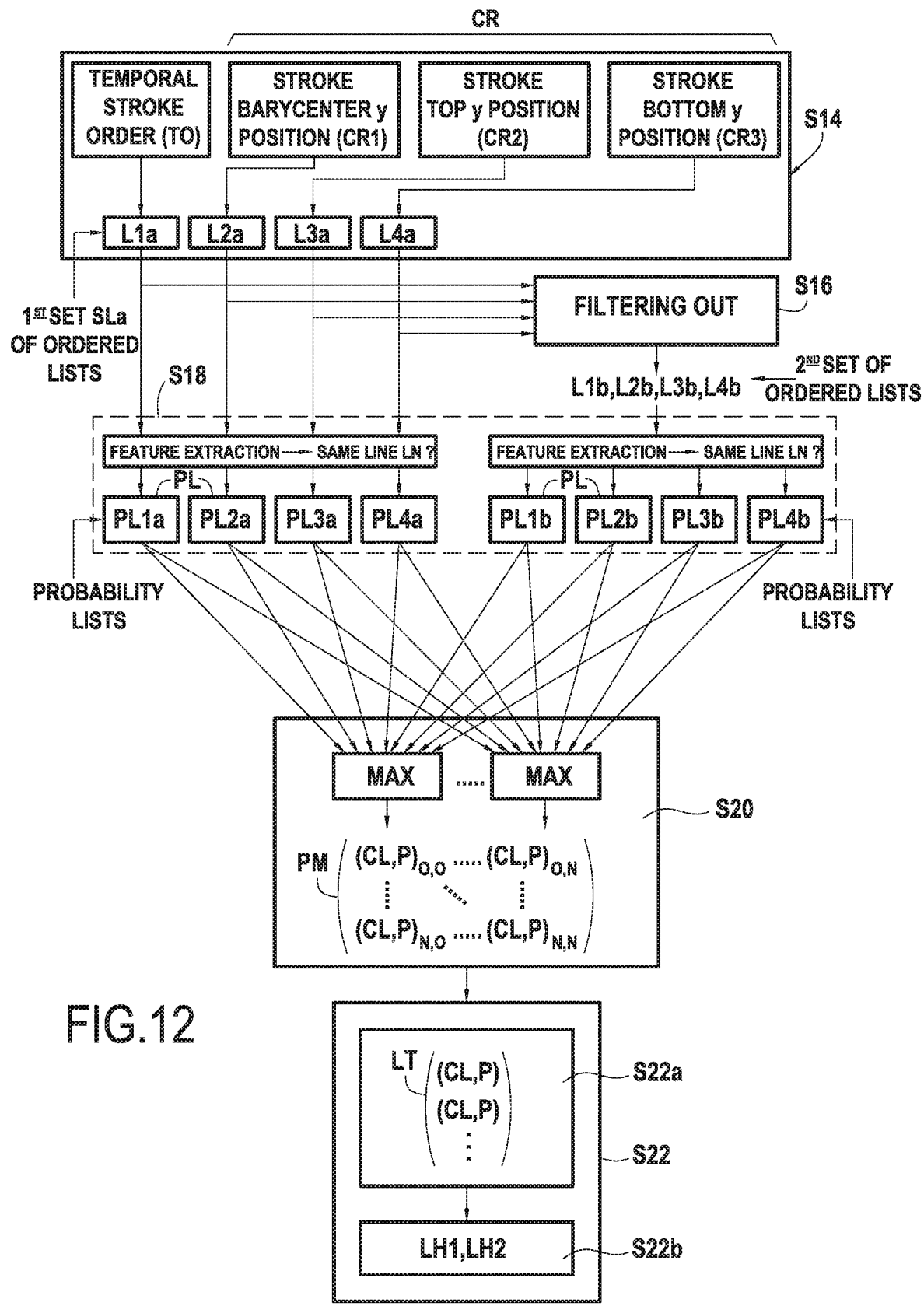
FIG. 12 is a block diagram representing schematically steps performed during a text line extraction, according to a particular embodiment of the invention.

Once the ordering step S14 and the forming step S16 are completed, the computing device 100 performs, for each strip SP, a neural net analysis S18 (also called inter-stroke analysis) to determine as a decision class CL, for each pair PR of consecutive strokes ST in each ordered list of said first set SLa and second set SLb of said strip SP, whether the two strokes ST of said pair PR belong to a same text line LN, in association with a probability score P (FIGS. 6 and 12). As a result of the neural net analysis S18, the computing device 100 may thus form, for each ordered list of the first and second sets SLa, SLb a respective so-called probability list (or probability sequence) PL of duplets (CL, P) assigned to respective pairs PR of consecutive strokes ST, namely:

a probability list PL1a of duplets (CL, P) determined for each pair PR of consecutive strokes in the temporally-ordered list L1a;

a probability list PL2a of duplets (CL, P) determined for each pair PR of consecutive strokes in the spatially-ordered list L2a;

a probability list PL3a of duplets (CL, P) determined for each pair PR of consecutive strokes in the spatially-ordered list L1a;

a probability list PL4a of duplets (CL, P) determined for each pair PR of consecutive strokes in the spatially-ordered list L4a;

a probability list PL1b of duplets (CL, P) determined for each pair PR of consecutive strokes in the temporally-ordered list L1b;

a probability list PL2b of duplets (CL, P) determined for each pair PR of consecutive strokes in the spatially-ordered list L2b;

a probability list PL3b of duplets (CL, P) determined for each pair PR of consecutive strokes in the spatially-ordered list L3b; and a probability list PL4b of duplets (CL, P) determined for each pair PR of consecutive strokes in the spatially-ordered list L4b.

In other words, in the neural net analysis S18, a first set PLa of probability lists (PL1a-PL4a) is derived from the first set SLa of strokes and a second set PLb (PL1b-PL4b) is derived from the second set SLb of strokes. This neural net analysis S18 is performed (S18) for each strip previously identified in the slicing step S12. As a result, a first set PLa of probability lists and a second set PLb of probability lists are formed in an analogous manner for each strip SP.

In the present example, the decision class CL thus represents a result as to whether the two strokes ST of a pair PR of consecutive strokes in one of the ordered lists in the first and second sets S1a, SLb belong to a same text line LN. The decision class CL for a pair PR may for instance be assigned either a first value (e.g. "same line") meaning that the two strokes of said pair PR are considered to be in a same text line LN, or a second value (e.g. "break line") meaning that the two strokes of said pair PR are considered to be in different text lines LN.

The probability score P (also called inter-stroke probability) represents the probability or level of confidence that the associated result CL is correct (i.e. that CL represents the correct result for said pair PR). Accordingly, a decision class CL in association with a probability score P are produced in the neural net analysis S18 for each pair PR of consecutive strokes ST in each of the ordered lists L1a-L4a (set SLa) and L1b-L4b (set SLb) obtained in S14 and S16, respectively. As a result, a list or sequence of duplets (CL, P) corresponding to each pair PR of consecutive strokes ST is generated (S18) for each ordered list of the first and second sets SLa, SLb (FIG. 12). As already indicated, this process S18 of generating lists of duplets (CL, P) is repeated for each strip SP.

In the present example, the neural net analysis S18 is performed by one or more artificial neural nets (ANNs), also called neural nets. Neural nets (or neural networks) are well known to the skilled person and will therefore not be described in detailed in the present disclosure.

In each of the first and second sets SLa, SLb of ordered lists, the timely-ordered list L1a (respectively L1b) may be analyzed by a first specialized neural net and each spatially-ordered list L2a-L4a (respectively L2b-L4b) may be analyzed by a distinct, second specialized neural network. The first neural net may be dedicated to temporally-ordered lists while the second neural net may be dedicated to spatially-ordered lists. Each specialized neural net may comprise two sub-neural nets which process in parallel the respective ordered-lists starting from the two ends, respectively.

In a particular embodiment, the neural net analysis S18 (FIGS. 6 and 12) comprises:

computing, by at least one artificial neural net, probability scores P representing the probability that the strokes ST, in each pair PR of consecutive strokes ST included in the ordered lists of the first and second sets SLa, SLb, belong to a same text line LN; and determining, as a decision class CL for each pair PR of consecutive strokes, that the strokes ST of said pair PR belong to a same text line LN if the probability score P reaches at least a probability threshold.

The neural net analysis S18 may be based on feature extractions which are performed to characterize each pair PR according to various criteria, including temporal and spatial criteria. For instance, the computing device 100 may use at least one of a temporal criterion and a spatial criterion, or a combination thereof. More particularly, the features extractions performed in S18 may be based on a temporal order in which the two strokes of each pair PR of consecutive strokes in the ordered lists of the sets SLa, SLb have been input and/or based on the inter-stroke space (or inter-stroke distance) between the two strokes ST in each pair PR of consecutive strokes in the ordered lists of the sets SLa, SLb. Various implementations of feature extractions may be contemplated to achieve the neural net analysis S18.

During the neural net analysis S18, metric values may be computed (e.g., barycenter distances, global shapes, stroke size and area, length, main orientation) used to compute the decision class CL and associated probability score P for each pair PR. Before being used, these metric values may be normalized based on various local (e.g., stroke size) and/or global (e.g., strip width) criteria.

In a particular embodiment, in the neural net analysis S18, the one or more artificial neural net analyses sequentially each pair PR of consecutive strokes ST in each ordered list of said first and second sets SLa, SLb to determine the respective decision class CL and probability score P, based on spatial and temporal information related to the strokes ST contained in the ordered list of said pair PR.

In a selection step S20 (FIGS. 6 and 12), the computing device 100 then selects, for each individual pair PR of consecutive strokes ST included in at least one ordered list of said first and second sets SLa, SLb generated (S14, S16) for all the strips SP, the decision class CL determined with the highest probability score P for said pair PR during the neural net analysis S18. In the present example, this selection S20 is thus made based on the probability lists PL generated in the neural net analysis S18 for all the strips SP. For instance, if a specific pair PR of consecutive strokes (STa, STb) occurs only once overall within the probability lists PL obtained in S18, then the associated decision class CL obtained in S18 for this pair PR is selected (S20). If, however, a specific pair PR of consecutive strokes (STa, STb) has a plurality of occurrences within the probability lists PL obtained in S18 for all the strips SP, then the decision class CL with the highest probability score P is selected (S20) for said pair PR from the probability lists PL.

The computing device 100 may thus compare the decision classes CL obtained for a same pair PR of consecutive strokes ST using different ordering criteria (temporal order TO and spatial criteria CR) during the ordering step S14, either from SLa or from SLb, and may only retain the best decision class CL having the highest probability score P, namely the decision class CL which is the most likely to represent the correct result for the pair PR. In particular, the computing device 100 may compare the probability score P obtained for a same pair PR present in at least two different strips SP to determine the decision class CL obtained with the highest probability score. By selecting only the best decision class CL among various probability lists obtained based on different (temporal and spatial) criteria, efficient text line extraction can be achieved.

Various implementations are possible to perform the selection S20 of the decision classes CL of highest probability score P. In the present example depicted in FIG. 12, in the selecting step S20, the computing device 100 compiles into a probability matrix PM the selected decision class CL, in association with the respective probability score P, for each pair PR of consecutive strokes ST included (or present) in at least one ordered list of the first and second sets SLa, SLb generated in S14 and S16 for all the strips SP. This global probability matrix PM is thus common for all the strips SP. This means that the entries of the probability matrix PM define duplets (CL, P) representing each pair PR of consecutive strokes ST having at least one occurrence in the ordered lists L1a-L4a and L1b-L4b produced for all the strips SP.

In a particular example, the probability matrix PM may contain more generally an entry (identified by an index) for each possible pair of strokes in a given strip SP (including pairs of strokes which are not adjacent strokes in at least one of the ordered lists of the first and second sets SLa, SLb). In this case, each entry of the probability matrix PM may remain at (CL=0, P=0) if they correspond to a pair of strokes which has no occurrence as a pair PR of consecutive strokes in at least one of the ordered lists L1a-L4a and L1b-L4b generated for all the strips SP.

After the selecting step S20, the computing device 100 defines (S22, FIGS. 6 and 12) text lines LN by combining strokes ST into line hypotheses LH based on the decision class CL with highest probability score P selected in the selection step S20 for each pair PR of consecutive strokes ST present in at least one of the ordered lists L1a-L4a and L1b-L4b.

Figure 13:
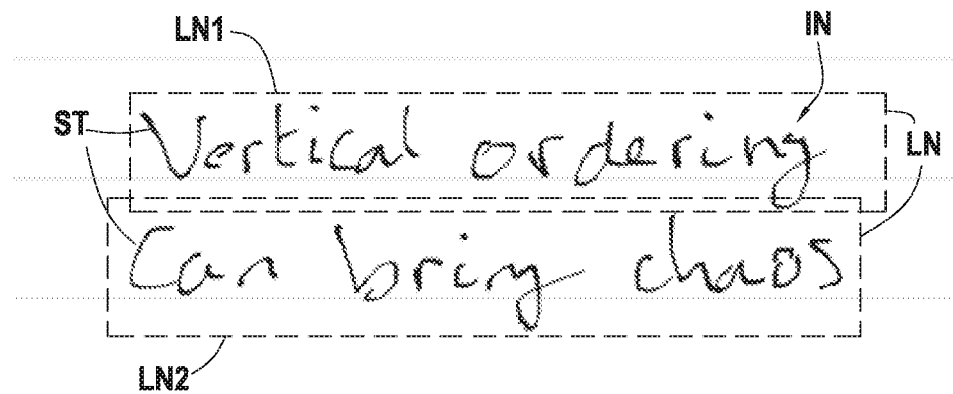
FIG. 13 represents text lines identified during a text line extraction, according to a particular embodiment of the invention.

As shown in FIG. 13, the computing device 100 determines in S22 the respective text line LN to which each stroke ST detected in S2 belongs. In the present example, two text lines LN are recognized, i.e. the text lines LN1 and LN2 corresponding respectively to the phrases "Vertical ordering" and "can bring chaos". These text lines LN1, LN2 correspond to two distinct line hypotheses LH obtained during the text line definition step S22.

Various implementations can be contemplated to define the line hypotheses LH (S22). In a particular embodiment described herebelow, the text line definition step S22 comprises a transformation step S22a and a line hypothesis analysis S22b, as described below.

More particularly, during the text line definition step S22, the computing device 100 may transform (S22a, FIG. 12) the probability matrix PM generated in S20 into a vector list LT of entries defining (or including) the decision class CL and associated probability score P (i.e. a duplet (CL, P)) for respectively each pair PR of consecutive strokes ST included in said probability matrix PM. As already indicated, each duplet (CL, P) included in the probability matrix PM corresponds to the decision class CL of the highest probability score P that was obtained for a particular pair PR of consecutive strokes during the neural net analysis S18 of all the strips SP.

The vector list LT may be arranged according to an order of decreasing values of the probability scores P of each pair PR. In a particular example, only entries of the probability matrix PM corresponding to pairs PR of consecutive strokes ST which have at least one occurrence in the first and second sets SLa, SLb of all the strips are retained into the vector list LT. In this case, any other entry of the probability matrix PM (e.g. entry with the values (CL=0, P=0)) corresponding to a pair of strokes which are not adjacent in any of the ordered lists L1a-L4a and L1b-L4b generated for each strip SP are not included into the vector list LT.

Still during the text line definition step S22, the computing device 100 may perform a line hypothesis analysis S22b (FIG. 12) to determine sequentially for each pair PR of consecutive strokes ST in the vector list LT, from the highest to lowest associated probability score P, a respective line hypothesis LH assigned to each stroke ST of said pair PR. Each line hypothesis LH constitutes a group of at least one stroke ST of a same text line LN. Each line hypothesis LH which is finally obtained, once all strokes ST of the vector list LT have been assigned (S22) to a respective line hypothesis LH, defines a respective text line LN as a result of the text line extraction S10 (FIG. 6). In other words, once the strokes ST present in all pairs PR of consecutive strokes ST in the first and second sets SLa, SLb generated for all the strips SP have been assigned to a respective line hypothesis LH, the resulting line hypotheses constitute text lines LN which collectively form the text handwriting IN detected in S2.

In a particular example, during the text line definition step S22, the computing device 100 combines the two strokes ST of a pair PR of consecutive strokes ST included in the vector list LT into a same line hypothesis LH corresponding to a same text line LN if the decision class CL previously selected in S20 with the highest probability score P for said pair PR indicates that the two consecutive strokes ST belong to a same text line LN and if the associated probability score P reaches at least (equals to or is higher than) a final threshold TH1. This way, line hypotheses LH can be gradually built (S22b) by deciding sequentially, for each of the two strokes ST of each pair PR in the vector list LT, whether or not the two strokes ST should be assigned to a same line hypothesis LH and by determining the allocated line hypotheses LH based on this decision and on the content of any previously generated line hypothesis LH during this step S22b.

An example is now described below with reference to FIGS. 14-15 to show how the line hypothesis analysis S22b (FIG. 12) may be performed according to a particular embodiment. Other implementations may however be contemplated.

In the present example, the computing device 100 determines (S22b, FIG. 12) sequentially for each pair PR of consecutive strokes ST in the vector list LT, from the highest to lowest associated probability score P, a respective line hypothesis LH assigned to each stroke ST of said pair PR. At the beginning of the line hypothesis analysis S22b, it is considered that each stroke ST constitutes a separate line hypothesis LH, although other implementations are possible. At this initial stage, it is assumed in this example that at least 3 strokes ST1, ST2 and ST3 constitute 3 respective initial line hypotheses LH1, LH2 and LH3. These strokes ST1, ST2 and ST3 have each at least one occurrence in the pairs PR of consecutive strokes ST present in the vector list LT.

It is first assumed that computing device 100 starts analyzing the vector list LT and selects (S23, FIG. 14) a first pair PR—noted PR1—of consecutive strokes (ST1, ST2) having the highest associated probability score P in the vector list LT. The computing device 100 then performs the following steps S24-S28 to determine for this current pair PR1 a respective line hypothesis LH to be assigned to each of the strokes ST1 and ST2 of the pair PR. The strokes ST1 and ST2 may remain in in their separate initial line hypotheses LH1, LH2 or be merged into a global line hypothesis depending on the probability score P associated with said pair (ST1, ST2).

In the present example, the computing device 100 determines (S24, FIG. 14) whether the following condition A) is met for the current pair PR1:
  A) the decision class CL previously selected in S20 with the highest probability score P for the current pair PR indicates that the two consecutive strokes ST of said pair PR belong to a same text line LN with a probability score P reaching at least a final threshold TH1 (condition A)).

In the present case, the condition A) is thus met if the duplet (CL, P) present in the vector list LT for the current pair PR1 indicates that the two consecutive strokes ST1, ST2 of the current pair PR belong to a same text line LN with a probability score P equal or above the final threshold TH1. If the condition A) is met, the method proceeds with step S26 (FIG. 14). Otherwise, the method proceeds with step S25.

In step S25, it is determined that the strokes ST1, ST2 of the current pair PR1 do not belong to the same text line LN and thus remain in their separate line hypotheses LH1, LH2 respectively. In other words, if the condition A) is not met, the existing line hypotheses LH remain unchanged and the method proceeds with step S23 to select a next current pair PR to be processed in the vector list LT.

In the present case, it is assumed for instance that the duplet (CL, P) for the current pair PR1 indicates that the two consecutive strokes ST1 and ST2 belong to a same text line LN with a probability score P of 95%. Assuming that the final threshold TH1 is set at 60% for instance, it is determined (S24) that the probability score P is above the final threshold TH1 and, therefore, the method proceeds with step S26.

In step S26 (FIG. 14), the computing device 100 determines whether the following condition B) is met for the current pair PR1:
  B) at least one stroke ST of the current pair PR is already in a line hypothesis LH comprising at least two strokes ST (condition B)).

In the present case, the condition B) is thus met in step S26 if either stroke ST1 or stroke ST2 (or both) are already in a line hypothesis LH comprising at least two strokes ST. If the condition B) is not met, the method proceeds with the merging step S28, otherwise the method proceeds with a decision process in step S27 to determine whether the merging step S28 should be executed (FIG. 14).

In the present example, it is considered at this stage that the strokes ST1 and ST2 are contained respectively in the distinct line hypotheses LH1 and LH2 which are both line hypotheses of a single stroke ST. Accordingly, the decision process S27 is not necessary and the method proceeds directly with the merging step S28.

In the merging step S28, the computing device 100 determines that the strokes ST1 and ST2 both belong to a same line hypothesis noted LH5 which is obtained by merging the line hypotheses LH1 and LH2 (LH5=ST1, ST2). The method then proceeds with step S23 to select a next current pair PR to be processed in the vector list LT.

The computing device 100 thus goes on with analyzing (steps S23-S28) successively each pair PR of consecutive strokes ST of the vector list LT in a decreasing order of probability score P. Line hypotheses LH are gradually built by assigning the two consecutive strokes ST of each successive pair PR to a respective line hypothesis LH based on the decision class CL and probability score P associated with the pair PR and also based on the line hypotheses LH previously created during the line hypothesis analysis S22b.

Figure 16:
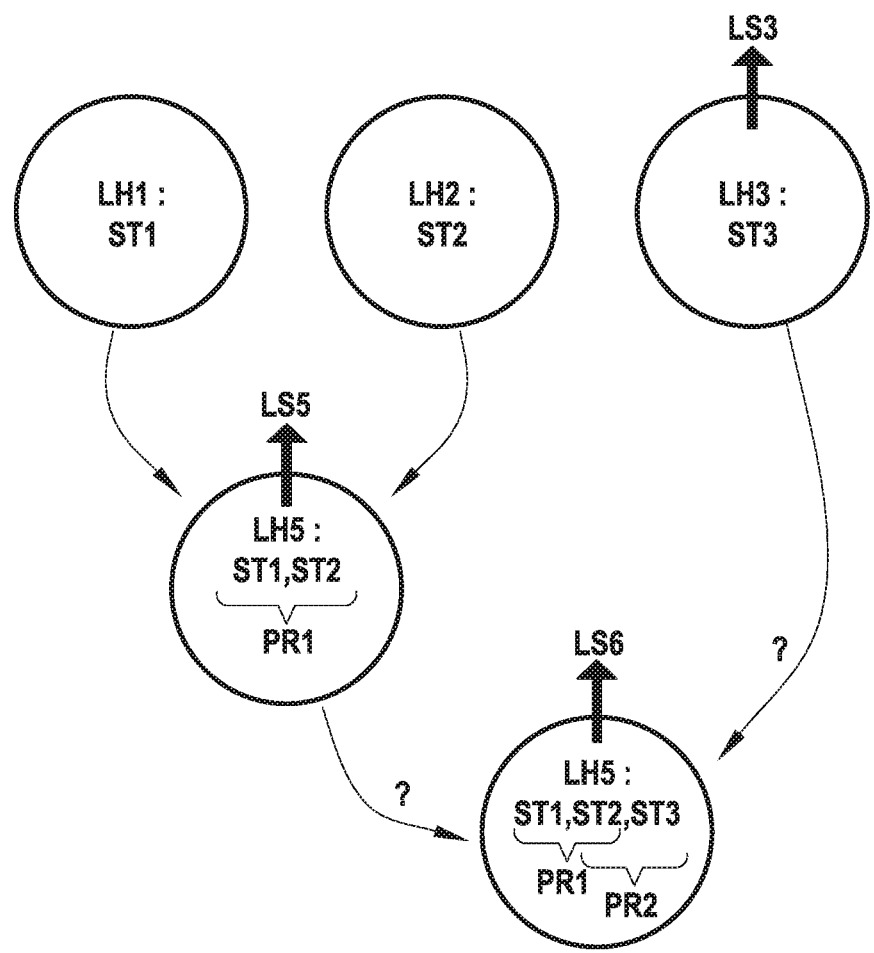
FIG. 16 represents schematically line hypotheses which are generated during a text line extraction, according to a particular embodiment of the invention.

In the present example, it is assumed that the computing device 100 now selects (S23) a new, so-called current, pair PR2 of consecutive strokes (ST2, ST3) within the vector list LT, moving still in a decreasing order of probability score P from the previously analyzed pair PR1 (ST1, ST2) in the vector list LT. At this stage, the line hypothesis LH5 contains the strokes ST1 and ST2 while the line hypothesis LH3 contains the single stroke ST3 (FIG. 16).

Figure 14:
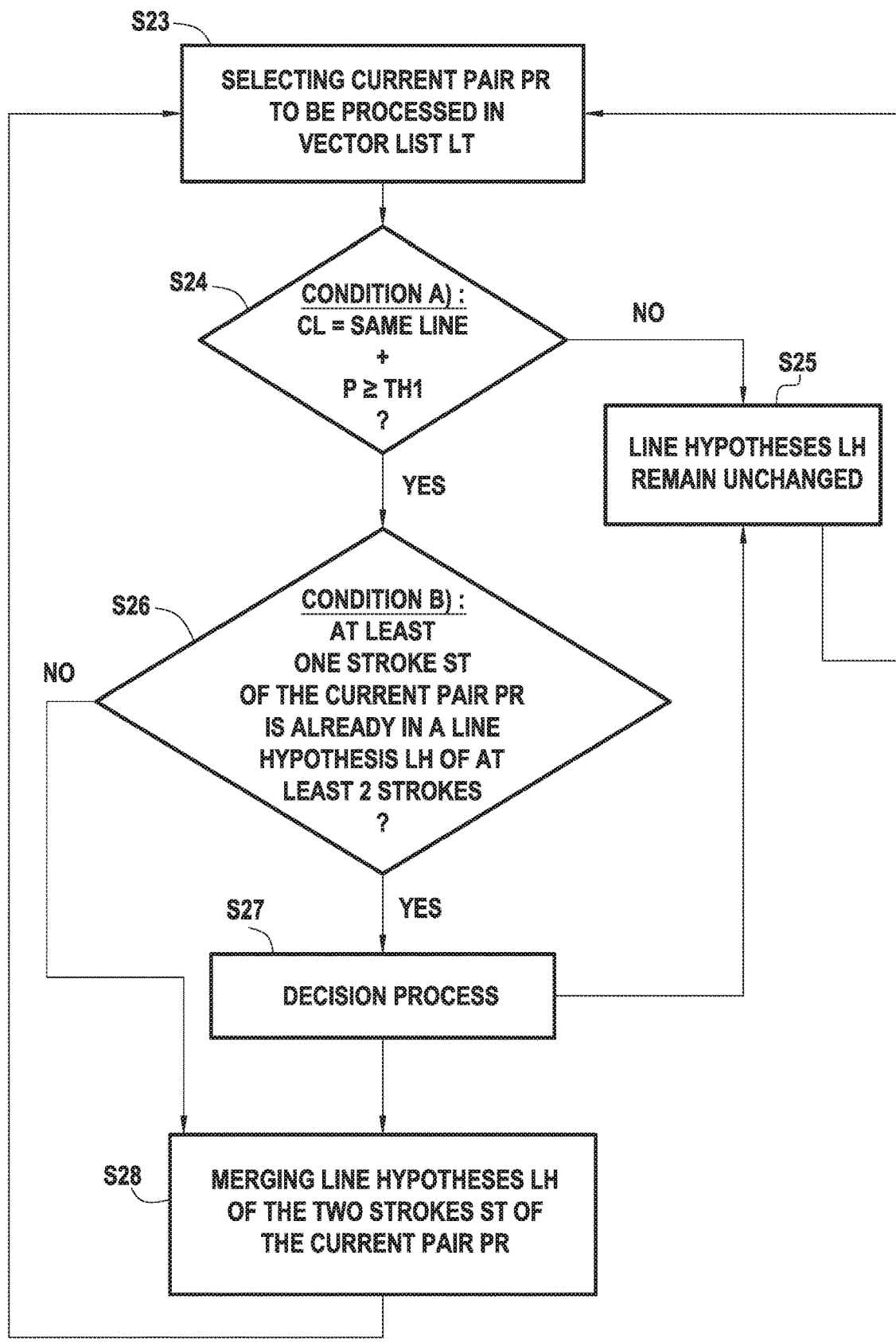
FIG. 14 is a block diagram representing schematically steps performed during a text line extraction, according to a particular embodiment of the invention.

It is assumed in this example that the computing device 100 detects in step S24 that the condition A) is met for the pair PR2 and thus proceeds with step S26 (FIG. 14). In step S26, the computing device 100 detects that the condition B) is not met (since stroke ST2 is already part of line hypothesis LH5 which contains more than one stroke, i.e. the two strokes ST1 and ST2). As a result, the method now proceeds with the decision process in step S27.

This decision process S27 is configured to determine if two existing line hypotheses (i.e. LH5 and LH3 in this case) should be combined when it is detected that conditions A) and B) are met for a current pair PR of consecutive strokes. Various ways of performing the decision process S27 are possible. Some examples are provided below for illustrative purpose only.

Figure 15A:
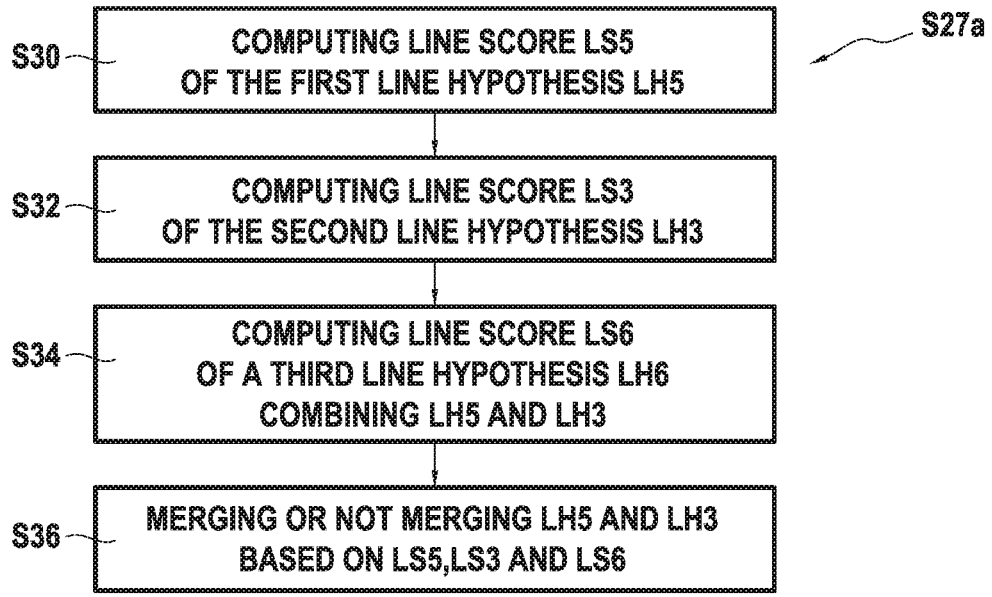
FIG. 15A is a flow diagram representing schematically steps of a method according to a first example of the invention.

A first example of implementing the decision process—referred to more specifically as S27a in this example—is now described with reference to FIGS. 15A and 16. In this first example, this decision process S27a is based on a computation of line scores LS. More particularly, in the present example, the computing device 100 performs the steps S30, S32, S34 and S36 during the decision process S27a, as described below.

Different implementations of the computing of the line scores LS are possible. As indicated further below, the line score may for instance be calculated using the logarithm of the probability scores ($P_L$) of each pair PR of strokes ST present in a given line hypothesis LH and the logarithm of the inverse probability scores ($1-P_L=P_B$) of each pair PR for which only one of the two constitutive strokes ST belongs to the LH.

In step S30, the computing device 100 computes a first line score LS5 of the first line hypothesis LH5 based on the probability scores P of each pair PR (i.e. PR1) of consecutive strokes ST already assigned to the first line hypothesis LH5, this first line score LS5 representing a likelihood that each stroke ST (i.e. ST1 and ST2) of this first line hypothesis LH5 is part of a same text line LN and that this text line LN is defined as complete by said line hypothesis LH5.

In this context, a text line LN is defined as complete by a line hypothesis LH if all the strokes ST that should belong to the same text line LN according to the probability scores P are effectively in said line hypothesis LH. In other words, a line score LS ensures that the probability scores P for each pair PR of consecutive strokes belonging to the same line hypothesis LH are associated with a decision class CL="same line" and that all other pairs PR involving only one stroke ST belonging to this line hypothesis LH are associated with a class CL="break line". In the present example, the line scores LS computed by the computing device 100 are values which represent a likelihood as mentioned above.

In step S32 (FIG. 15A), the computing device 100 computes a second line score LS3 of the second line hypothesis LH3 based on the probability scores P of each pair PR of consecutive strokes ST already assigned to the second line hypothesis LH3, this second line score LS3 representing a likelihood that each stroke ST (i.e. ST3) of this second line hypothesis LH3 are part of a second text line LN. At this stage, the line hypothesis LH3 only contains a single stroke, namely ST3. Although there is no pair of strokes having both strokes STa and STb in the same LH, there are pairs of strokes that involve stroke ST3 with other strokes outside the respective line hypothesis LH. Here the relevant pairs would be (ST3, ST1) and (ST3, ST2). When computing the line score LS3 of the line hypothesis LH3, there are no pairs that contribute to this same line hypothesis (i.e. no calculation of log $P_L$) but there are still pairs that can be used to calculate the "Break Line" (or different line) hypothesis, i.e. the log Pb, and more particularly the log Pb (ST3, STx) with STx belonging to LH2.

In step S34, the computing device 100 computes a third line score LS6 based on the probability scores P of each pair PR (i.e. PR1, PR2) of consecutive strokes ST assigned to a third line hypothesis LH6 combining each stroke ST of the first and second line hypotheses LH5, LH3, this third line score LS6 representing the likelihood that each stroke of these first and second line hypotheses LH5, LH3 are part of a third text line LN.

In step S36, the computing device 100 determines whether the first and second line hypotheses LH5, LH3 should be merged into this third line hypothesis LH6 based on a comparison of a sum S1 of the first line score LS5 and second line score LS3 (S1=LS5+LS3) with the third line score LS6.

The line scores LS5, LS3 and LS6 represent how well the constitutive strokes ST of each respective line hypothesis LH5, LH3 and LH6 fit together to form collectively a text line LN. The line scores LS5, LS3 and LS6 mentioned above may be calculated in different manners, implementation details being at the discretion of the skilled person. The computing device 100 merges the first and second line hypotheses LH5, LH3 into the third line hypothesis LH6 corresponding to a third text line if it is determined during the decision process S27a that the third line score LS6 exceeds the total S1 of the first and second line scores LS5, LS3 (i.e. if LS6>S1, or in other words, if the ratio LS6/S1>1). To be more accurate, the first and second line hypotheses LH5, LH3 may be merged into the third line hypothesis LH6 if LS6>S1−CP, where CP is a common part in the score computation shared by the first and second line hypotheses LH5, LH3. This common part CP corresponds to the line score subpart resulting from pairs PR having one stroke ST in the first line hypothesis LH5 and another in the second line hypothesis LH3. These stroke pair contributions are computed in LS5 and LS3 but only once in LS6.

The probability scores P used in the computation of LS5, LS3 and LS6 can be derived from the probability matrix PM obtained in the selecting step S20.

If it is determined in S36 that the line hypotheses LH5, LH3 should be merged, the computing device 100 merges these line hypotheses (FIG. 14). The method then proceeds once again at step S23 to select a next current pair PR in the vector list LT and the process S23-S28 is repeated until all the pairs PR of the vector list LT have been processed to build the line hypotheses LH.

Figure 15B:
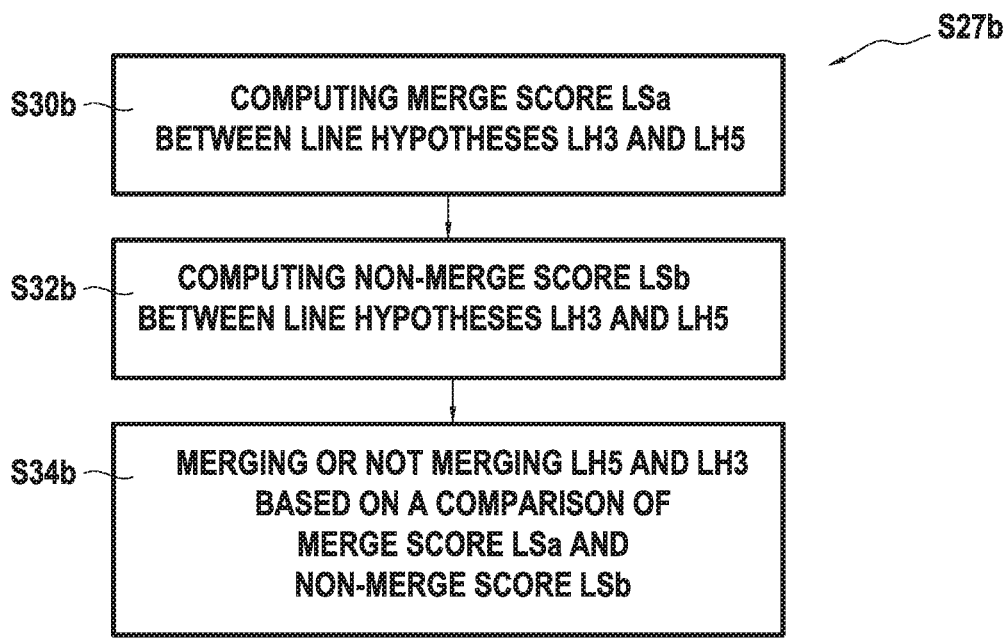
FIG. 15B is a flow diagram representing schematically steps of a method according to a second example of the invention.

In another example, the decision process S27 (FIG. 14)—referred to more specifically as S27b in this example—is now described with reference to FIG. 15B. As already mentioned, the decision process S27b allows to determine whether the line hypotheses LH3 and LH5 should be merged. In step S30b, a merge score LSa between LH3 and LH5 is computed. In step S32b, a no-merge score LSb between LH3 and LH5 is computed. The decision of merging or not two line hypotheses (i.e. LH5 and LH3 in this example) rely only on the pairs PR for which the first stroke STa belongs to the first line hypothesis LH (here LH3) and the second stroke STb belongs to the second line hypothesis LH (here LH5). In the present example, only the probabilities P of pairs PR (ST1, ST3) and (ST2, ST3) are relevant for determining whether LH3 and LH5 should be merged. Accordingly, the two following line scores are computed: the merge score LSa which defines how well the two probability scores P associated with the two pairs PR suit a merge; and the second score LSb which defines how well the two probability scores associated with the two pairs PR suit a merge refusal (thus having better line hypotheses with LH3 and LH5 than a merged line hypothesis LH6). The first line score LSa is defined as the combination of logarithm of probability P for class CL="same line" (so called $P_L$) for all relevant pairs PR (here (ST1, ST3) and (ST2, ST3)). The second line score LSb is defined as the combination of logarithm of probability P for class CL="break line" (so called PB) for all relevant pairs PR (here (ST1, ST3) and (ST2, ST3)). In step S36b, the two scores LSa and LSb are then compared to decide if the line hypotheses LH5 and LH3 should be merged or not. In this example, if the merge score LSa is greater than the non-merge score LSb, this means that the line hypotheses LH3 and LH5 should be merged into a better line hypothesis LH6. If the decision is yes, then a majority of (ideally all) the probability scores P for pairs PR involving the strokes ST1, ST2 and ST3 (and only those three) should be associated with a decision class CL="same line". If however the decision is that the line hypotheses LH3 and LH5 should not be merged, then a majority of (ideally all) the probability scores P of pairs PR involving one stroke from the first line hypothesis LH3 and one other stroke from the second line hypothesis LH5 should be associated with a decision class CL="break line".

It should be noted that if the pairs (ST1, ST3) and (ST2, ST3) both exist in the probability matrix PM, then the computation of the merge score LSa involves the combination of two probabilities ($P_L$(ST1, ST3) and $P_L$(ST2, ST3)) and the computation of the non-merge score LSb involves the combination of two probabilities as well ($P_B$(ST1, ST3) and $P_B$(ST2, ST3)), having $P_L=1-P_B$ and $P_B=1-P_L$ for each pair. This can be see as another way of describing the computation of the line scores as mentioned earlier.

It should be noted that two types of probability score P may be used in the present invention:
- a "same line" probability score—noted $P_L$—representing the probability that a pair PR of consecutive strokes ST belong to a same text line LN (e.g. probability score associated with the decision class CL="same line"); and/or
- a "break line" probability score—noted $P_B$—representing a probability that a pair PR of consecutive strokes ST do not belong to a same text line LN (e.g. probability score associated with the decision class CL="break line").

In one example the line score is calculated using the logarithm of the probabilities ($P_L$) of each pair PR of strokes ST present in a given line hypothesis LH and the logarithm of the inverse probability ($1-P_L=P_B$) of each pair PR for which only one of the two constitutive strokes ST belongs to the LH.

In the present example, the entries included in the probability matrix PM may define either a same line probability scores $P_L$ or break line probability scores $P_B$ but it is the same line probability score $P_L$ which are used to compute the line scores. Accordingly, any break line probability score $P_B$ which may be derived from the probability matrix PM is converted into a corresponding same line probability score $P_L$ ($P_L=1-P_B$). Various implementations are possible, using either same line probability scores $P_L$, or break line probability scores $P_B$, or a combination of the two in the probability matrix PM.

As shown in FIG. 6, once the generation S22 of the line hypotheses LH is completed, the computing device 100 may perform (S24) any appropriate post-processing depending on the implemented configuration. This post-processing step S24 may be used for instance to fix some obvious mistakes that may happen in the text line extraction S10 due to very particular stroke contexts, for instance when one neural net makes a mistake that cannot be compensated for or corrected by another neural net.

The present invention allows for an efficient and reliable text line extraction when handwriting recognition is performed on text handwriting by a computing device. As indicated earlier, line extraction is a key step in text recognition and it may not always produce satisfactory results, especially regarding some types of strokes such as diacritics, punctuation marks and the like. More generally, errors may arise during text line extraction when text handwriting is input in a non-chronological order.

Figures 17A, 17B:
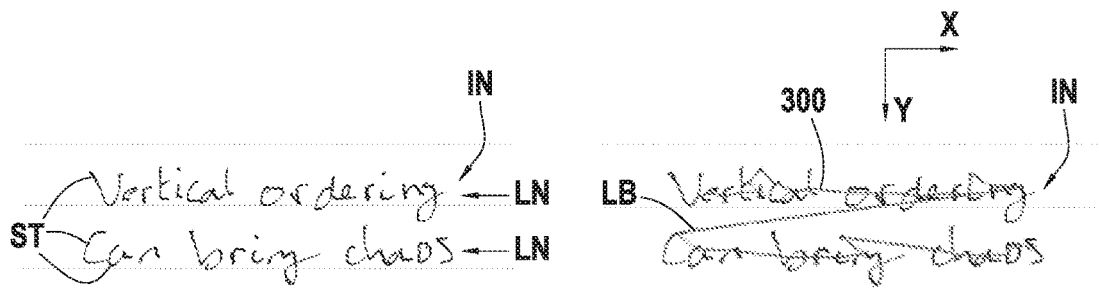
FIGS. 17A-17D illustrate schematically how the present invention can limit vertical chaos ordering in accordance with a particular embodiment.
Figures 17C, 17D:
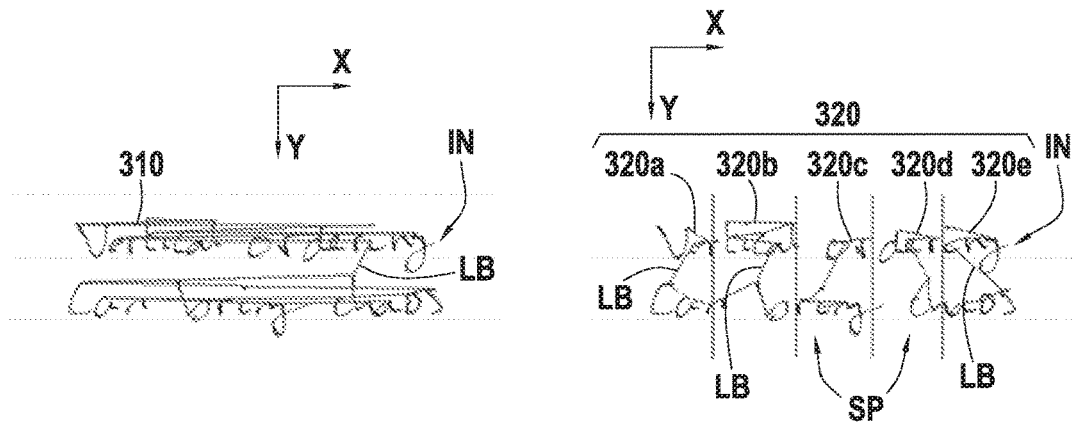

The invention relies on several aspects which functionally interact with each other to achieve efficient text line extraction, as described earlier in particular embodiments. In particular, slicing text handwriting IN allows the computing device 100 to take decisions in different contexts with respect to each stroke ST of digital ink. The slicing step facilitates processing during the neural net analysis. If no slicing of the text input into multiple strips were performed, all the text strokes ST of the text handwriting IN would be contained in a single region as shown in FIG. 17A. The temporal and spatial reordering would thus be carried out globally on the entire text as a unique region. Temporal ordering would follow the natural user's handwriting order, as shown for instance in FIG. 17B. The spatial ordering along Y orientation would result in a more chaotic path, in particular regarding the position of consecutive strokes ST in the handwriting orientation X, as shown in FIG. 17C. The spatial sequences of strokes would appear random in terms of X positions.

Text slicing as performed in the present invention leads to a less chaotic spatial ordering, as shown in FIG. 17D. Slicing a document reduces the span in the handwriting orientation X along which the random pattern mentioned above appears.

As can be seen in FIGS. 17B and 17C, line breaks—noted LB—occur rarely when temporal or spatial ordering is performed without text slicing (typically only one line break LB between one pair of strokes). During a neural net analysis, a neural net would thus have only one opportunity to detect this break (or separation) between two text lines LN. Slicing the text handwriting IN in K slices (K>1) gives rise to at most K chances for the neural net to detect the break between two text lines LN, as shown in FIG. 17D where slicing into 5 strips leads to 5 different line breaks LB that may each be detected during neural net analysis.

Another advantage of text slicing is that it brings variability of stroke context for some strokes ST. Without slicing, a large stroke ST for instance may only be linked to one stroke in a text line above and to one stroke in a text line below. By slicing the document, this large stroke ST can be included in several slices, while other smaller strokes will not appear in all the same slices.

Figures 18A, 18B:
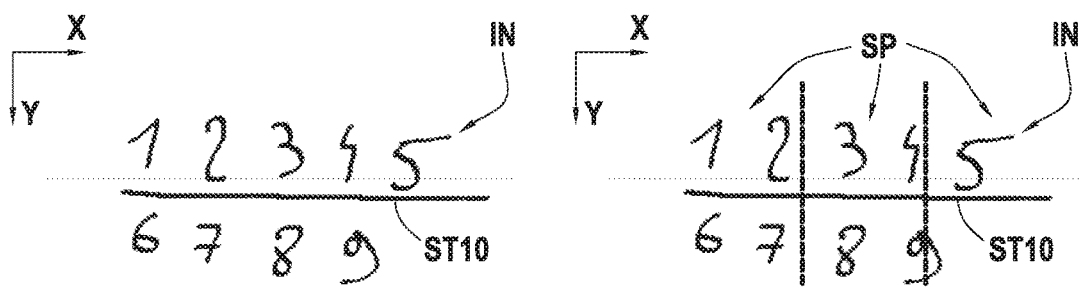
FIGS. 18A-18B illustrate schematically how the present invention can bring variability of stroke context in accordance with a particular embodiment.

FIG. 18A illustrates for instance a case where a large stroke ST10 (a fraction bar) extends horizontally in the handwriting orientation X. By dividing the text handwriting IN into multiples slices SP as shown in FIG. 18B, this long stroke ST10 can be more efficiently processed during line text extraction as it will be included in different slices SP and thus treated in different stroke contexts. Assuming that each digit 1-9 is made of one stroke ST, it can be seen that, without slicing, a vertical ordering gives the stroke order [1, 2, 3, 4, 5, ST10, 6, 7, 8, 9] (FIG. 18A). The fraction bar ST10 will be detected and treated in the text line extraction process only in two pairs PR of consecutives strokes, namely: (5, ST10) and (ST10, 6). However, with a slicing in 3 strips as shown in FIG. 18B, 3 spatial stroke orders can be generated, namely: [1, 2, ST1, 6, 7]; [3, 4, ST10, 8, 9]; and [5, ST10 bar, 9]. The fraction bar ST10 can thus be detected and treated in 6 different pairs of strokes ST during the text line extraction process.

Finally, generating stroke orders in restricted strips allows limiting line break oscillations between two text lines LN. A stroke order without break oscillation is a stroke order where the strokes of each text line LN are grouped in the ordered lists (all strokes from text line LN1, then all strokes from text line LN2, and so on). Oscillations occur for instance when a stroke from a previous text line LN appears in an ordered list in the middle of another text line LN. For example, oscillation occurs in an ordered list comprising successively some strokes ST from a line LN1, then one or several strokes ST from a line LN2 and again some strokes ST from text line LN1, and so on. Such oscillating orders are more difficult to analyze by a neural net. By slicing the text handwriting as described earlier, oscillations in the ordered lists can be limited.

By configuring the strip SP so that they overlap with each other as described earlier, the process of text line extraction can be improved even further. Implementations are the strips SP do not overlap are however also possible. Setting for instance a 75% overlap between each pair PR of adjacent strips SP ensures that each stroke ST will be found in several different stroke context by the computing device 100 during the text line extraction (FIGS. 7-8).

Figure 19:
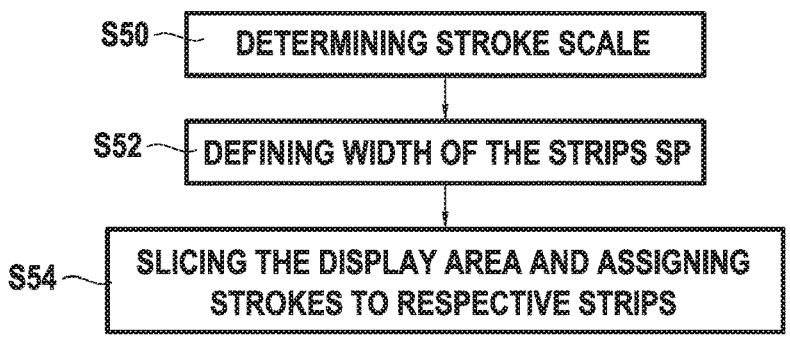
FIG. 19 is a flow diagram representing schematically steps of a method according to particular embodiments of the invention.

As shown in FIG. 19, the width WD of the strips SP may be defined based on the scale of the strokes ST contained in the handwriting input IN. In the particular embodiment shown in FIG. 19, the computing device 100 determines (S52) during the slicing step S12 (FIGS. 6-8) a width WD of the strips SP based on the scale (or size) of the strokes ST forming the text handwriting IN. The scale of the strokes ST are previously determined (S50) according to any suitable technique known to the skilled person. The computing device 100 then slices (S54) the display area containing the strokes ST, as already described, and assigns each stroke ST to a least two respective strips SP.

In a particular embodiment, the slicing S12 (FIGS. 6-8) is configured so that each pair PR of adjacent strips SP partially overlap with each other to share between 50% and 85% of their respective area.

By generating multiple stroke orders per slice in an overlapping slice environment, it is highly probable that a pair of consecutive stroke ST will be found several times by the computing device 100, thereby producing as many probability scores for a same pair PR of consecutive stroke ST during the neural net analysis. By selecting only the neural net decision that gives the higher probability score P, efficient text line extraction can be achieved.

Further, as described earlier, the computing device 100 may generate a first set SLa of ordered lists of strokes during the ordering step S14 (FIGS. 6, 9 and 12). By generating for each strip SP multiples ordered lists according to various criteria (temporal order and spatial criteria), the line breaks LB can be identified even more easily since one given line break can be identified in a particular pair PR of consecutive strokes in each ordered list. Generating different stroke orders can be seen as analyzing the problem of text line extraction through different points of view to assist the computing device in finding, for each pair PR of consecutive strokes, the best stroke context that will result in the best decision.

More specifically, by generating a temporal order of strokes for each vertical slice, temporal orders easier to process than a global one can be generated. It limits the delayed stroke gap. Additionally, strokes from user corrections or the like may be processed temporally closer to their stroke context. The spatial analysis is also facilitated in a sliced environment, since reordering strokes based on a spatial order helps discovering the local gaps between strokes that can be inter-line space. The stroke distribution on the X axis (along the handwriting orientation) may sometimes be chaotic. The text slicing performed in the present invention allows limiting this stroke distribution chaos and facilitates processing by the neural net.

The more slices and the more ordered lists per slices, the more likely the computing device 100 will detect several times the same pair PR of consecutive strokes ST during the process of text line extraction. A trade-off should however achieved between the number of opportunities to identify line breaks LB and the required resources and time to implement the text line extraction. It has been observed for instance that generating 4 different ordered lists per strip according to for different criteria affords goods results. It has also been observed that generating a temporally-ordered list of strokes and at least one spatially-ordered ordered list of strokes, as described earlier, allows for a highly efficient text line extraction, although other implementations are possible.

Still further, as described earlier, the computing device may also generate a second set SLb of ordered lists by filtering out relatively small strokes ST from the ordered lists of the first set SLa (step S16, FIGS. 6, 11 and 12). As already discussed, relatively small strokes such as diacritics and the like can cause errors during text line extraction. Removing these relatively small strokes from the ordered lists during the text line extraction allows comparing the decision classes and associated probability scores obtained for each pair PR of consecutive strokes with and without these relatively small strokes ST. The decision classes with the best level of confidence (with highest probability scores) can be retained and used for building text line hypotheses, thereby allowing for an efficient and reliable text line extraction.

In the present invention, one or more neural nets can be used to deal with the temporal and spatial aspects of handwriting, as described earlier. The system may automatically decide to follow the temporal or the spatial aspect depending on the stroke context.

As also described, two specialized neural networks can be used to deal respectively with temporal and spatial orderings, although this is only one example among the possible implementations. Recurrent Neural Networks (RNN) may be particularly well suited in some cases to perform the neural net analysis.

It should be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved. For instance, the line scores contemplated with reference to FIGS. 14, 15A and 15B may be computed in different orders.

In a particular embodiment, in addition to the ordered lists L1a-L4a and L1b-L4b generated (S14, S16, FIG. 6) for each strip SP, the computing device 100 is configured to also generate two additional temporally ordered lists L5a and L5b for the entire area formed by all the strips SP. More particularly, the computing device 100 orders together all the strokes ST of the text handwriting IN (FIG. 4) to generate a so-called third timely-ordered list L5a of strokes ST arranged in a temporal order (TO) and also forms a so-called fourth timely-ordered list L5b by filtering out from the third timely-ordered list L5a the strokes ST below a size threshold. These timely-ordered lists L5a and L5b are generated in an analogous manner to the respective timely-ordered lists L1a and L1b as described earlier, with the difference that the lists L5a and L5b correspond to all the strips SP together instead of corresponding to a single one of the strips SP. The neural net analysis S18 (FIGS. 6 and 12) is also applied on these timely-ordered lists L5a and L5b. Namely, during the neural net analysis S18, the computing device 100 also determines as a decision class CL, for each pair PR of consecutive strokes ST in the third and fourth timely-ordered lists L5a, L5b, whether the strokes of said pair belong to a same text line LN, in association with a probability score P for said decision class. These timely-ordered lists L5a and L5b are also be taken into account (together with all the ordered lists L1a-L4a and L1b-L4b generated for each strip SP) when selecting for each pair PR a decision class CL with the highest probability score P during step S20 (FIGS. 6 and 12). In other words, during the selection step S20, the computing device 100 may select the decision class CL determined with the highest probability score P during the neural net analysis S18 for each pair of consecutive strokes included (or present) in at least one of the ordered lists L1a-L4a, the ordered lists L1b-L4b, the third timely-ordered list L5a and the fourth timely-ordered list L5b. This particular embodiment allows to further improve the definition of text lines LN in some specific cases.

The present invention having been described in particular embodiments, it is clear that it is susceptible to numerous modifications and embodiments within the ability of those skilled in the art, in accordance with the scope of the appending claims. In particular, the skilled person may contemplate any and all combinations and variations of the various embodiments described in this document that fall within the scope of the appended claims.

The invention claimed is:

1. A method for processing text handwriting on a computing device, the computing device comprising a processor, a memory and at least one non-transitory computer readable medium for recognizing input under control of the processor, the method comprising:
displaying, in a display area, strokes of digital ink which are input substantially along a handwriting orientation;
performing text line extraction to extract text lines from said strokes, said text line extraction comprising:
slicing said display area into strips extending transversally to the handwriting orientation, wherein adjacent strips partially overlap with each other so that each stroke is contained in at least two adjacent strips;
ordering, for each strip, the strokes at least partially contained in said strip to generate a first timely-ordered list of strokes arranged in a temporal order and at least one first spatially-ordered list of strokes ordered according to at least one respective spatial criterion, thereby forming a first set of ordered lists;
forming, for each strip, a second set of ordered lists comprising a second timely-ordered list of strokes and at least one second spatially-ordered list of strokes by filtering out strokes below a size threshold from said first timely-ordered list and from said at least one first spatially-ordered list respectively;
performing a neural net analysis to determine as a decision class, for each pair of consecutive strokes in each ordered list of said first and second set, whether the strokes of said pair belong to a same text line, in association with a probability score for said decision class;
selecting, for each pair of consecutive strokes included in at least one ordered list of said first and second sets, the decision class determined with the highest probability score during the neural net analysis; and
defining text lines by combining strokes into line hypotheses based on the decision class with highest probability score selected for each pair of consecutive strokes.

2. The method of claim 1, wherein said strokes of digital ink are input in a free handwriting format devoid of any handwriting guiding constraint.

3. The method of claim 1, wherein said slicing is configured so that the strips extend along a same strip orientation.

4. The method of claim 3, wherein said slicing comprises:
determining a width of the strips based on the scale of the strokes; and
assigning each stroke to each strip in which said stroke is at least partially contained.

5. The method of claim 3, wherein said slicing is configured so that each pair of adjacent strips partially overlap with each other to share between 50% and 85% of their respective area.

6. The method of claim 3, wherein said at least one first spatially-ordered list generated for each strip in said ordering comprises at least one of:
a spatially-ordered list of strokes ordered according to the position, along the strip orientation, of the respective barycenter of each stroke of said strip;
a spatially-ordered list of strokes ordered according to the outermost coordinate in a first direction along the strip orientation of each stroke of said strip; and
a spatially-ordered list of strokes ordered according to the outermost coordinate in a second direction, opposite said first direction, along the strip orientation of each stroke of said strip.

7. The method of claim 1, wherein said forming a second set of ordered lists comprises, for each strip:
evaluating a first size of each stroke of said strip based on at least one of a height or maximum distance in the strip orientation of said stroke and a second size of each stroke of said strip based on the length of said stroke;
removing, from said first timely-ordered list and from said at least one first spatially-ordered list, each stroke when either said first or second size is below a size threshold, thereby generating respectively the second timely-ordered list and said at least one second spatially-ordered list.

8. The method of claim 1, wherein said neural net analysis comprises:
computing, by at least one artificial classifier or neural net, probability scores representing the probability that the strokes, in each pair of consecutive strokes included in the ordered lists of said first and second sets of ordered lists, belong to a same text line;
determining, as a decision class for each pair of consecutive strokes, that the strokes of said pair belong to a same text line if the probability score reaches at least a probability threshold.

9. The method of claim 8, wherein during the neural net analysis, said at least one artificial neural net analyses sequentially each pair of consecutive strokes in each ordered list of said first and second sets to determine the respective decision class and probability score, based on spatial and temporal information related to the strokes in said ordered list.

10. The method of claim 1, wherein said selecting comprises:
compiling into a probability matrix the selected decision class, in association with the respective probability score, for each pair of consecutive strokes included in at least one ordered list of said first and second sets.

11. The method of claim 1, wherein said defining text lines comprises:
transforming the probability matrix into a vector list of entries including the decision class and associated probability score for each pair of consecutive strokes included in said probability matrix, said vector list being arranged according to an order of decreasing value of the probability scores of each pair; and
determining sequentially for each pair of consecutive strokes in the vector list, from the highest to lowest associated probability score, a line hypothesis assigned to said pair of consecutive strokes, wherein each line hypothesis comprises at least one stroke of a same text line,
wherein each line hypothesis obtained, once all strokes of the vector list have been assigned to a respective line hypothesis, defines a respective text line.

12. The method of claim 11, wherein during said defining text lines, the two strokes of a pair of consecutive strokes included in the vector list are combined into a same line hypothesis corresponding to a same text line if the decision class previously selected with the highest probability score for said pair indicates that the two consecutive strokes belong to a same text line and if said highest probability score reaches at least a final threshold.

13. The method of claim 12, wherein said defining text lines comprises:
selecting a pair of consecutive strokes included in the vector list, namely a first and second stroke belonging respectively to a first and second line hypothesis, wherein at least one of the first and second line hypotheses comprises at least two strokes;
upon detecting that the first and second strokes of said pair belong to a same text line with a highest probability score reaching at least the final threshold, the computing device performs a decision process comprising:
computing a first line score of the first line hypothesis based on the probability scores of each pair of consecutive strokes already assigned to the first line hypothesis, said first line score representing a likelihood that each stroke of said first line hypothesis are part of a first text line;
computing a second line score of the second line hypothesis based on the probability scores of each pair of consecutive strokes already assigned to the second line hypothesis, said second line score representing a likelihood that each stroke of said second line hypothesis are part of a second text line;
computing a third line score based on the probability scores of each pair of consecutive strokes assigned to a third line hypothesis combining each stroke of the first and second line hypotheses, said third line score representing the likelihood that each stroke of said first and second line hypotheses form together a third text line; and
determining whether the first and second line hypothesis are merged into said third line hypothesis based on a comparison of a sum of the first and second line score with the third line score.

14. A non-transitory computer readable medium having a computer readable program code embodied therein, said computer readable program code adapted to be executed to implement a method for processing text handwriting on a computing device, the computing device comprising a processor, a memory and at least one non-transitory computer readable medium for recognizing input under control of the processor, the method comprising:
displaying, in a display area, strokes of digital ink which are input substantially along a handwriting orientation;
performing text line extraction to extract text lines from said strokes, said text line extraction comprising:
slicing said display area into strips extending transversally to the handwriting orientation, wherein adjacent strips partially overlap with each other so that each stroke is contained in at least two adjacent strips;
ordering, for each strip, the strokes at least partially contained in said strip to generate a first timely-ordered list of strokes arranged in a temporal order and at least one first spatially-ordered list of strokes ordered according to at least one respective spatial criterion, thereby forming a first set of ordered lists;
forming, for each strip, a second set of ordered lists comprising a second timely-ordered list of strokes and at least one second spatially-ordered list of strokes by filtering out strokes below a size threshold from said first timely-ordered list and from said at least one first spatially-ordered list respectively;
performing a neural net analysis to determine as a decision class, for each pair of consecutive strokes in each ordered list of said first and second set, whether the strokes of said pair belong to a same text line, in association with a probability score for said decision class;
selecting, for each pair of consecutive strokes included in at least one ordered list of said first and second sets, the decision class determined with the highest probability score during the neural net analysis; and
defining text lines by combining strokes into line hypotheses based on the decision class with highest probability score selected for each pair of consecutive strokes.

15. A computing device for processing handwriting text, comprising:
a display unit for displaying, in a display area, strokes of digital ink which are input substantially along an handwriting orientation;
a line extraction unit for performing text line extraction to extract text lines from said strokes, said line extraction unit comprising:
a slicing module for slicing said display area into strips extending transversally to the handwriting orientation, wherein adjacent strips partially overlap with each other so that each stroke is contained in at least two adjacent strips;
an ordering module for ordering, for each strip, the strokes at least partially contained in said strip to generate a first timely-ordered list of strokes arranged in a temporal order and at least one first spatially-ordered list of strokes ordered according to at least one respective spatial criterion, thereby forming a first set of ordered lists;
a forming module for forming, for each strip, a second set of ordered lists comprising a second timely-ordered list of strokes and at least one second spatially-ordered list of strokes by filtering out strokes below a size threshold from said first timely-ordered list and from said at least one first spatially-ordered list respectively;

a neural net module for performing a neural net analysis to determine as a decision class, for each pair of consecutive strokes in each ordered list of said first and second set, whether the strokes of said pair belong to a same text line, in association with a probability score for said decision class;

a selecting module for selecting, for each pair of consecutive strokes included in at least one ordered list of said first and second sets, the decision class determined with the highest probability score during the neural net analysis; and a line definition module for defining text lines by combining strokes into line hypotheses based on the decision class with highest probability score selected for each pair of consecutive strokes.

* * * * *